(12) United States Patent
Shibata et al.

(10) Patent No.: US 6,398,638 B1
(45) Date of Patent: Jun. 4, 2002

(54) VEHICLE AIR CONDITIONER WITH MANUALLY OPERATED OPERATION MEMBER

(75) Inventors: Kazuji Shibata, Kariya; Yoshio Yoshida, Handa, both of (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/916,959

(22) Filed: Jul. 27, 2001

(30) Foreign Application Priority Data

Aug. 9, 2000 (JP) ........................................ 2000-241534

(51) Int. Cl.[7] .................................................. F24D 5/10
(52) U.S. Cl. ........................ 454/69; 454/121; 74/89.18
(58) Field of Search ................................ 454/121, 126, 454/127, 132, 69, 93, 145, 152; 74/412 R, 413, 414, 89.18, 435, 436, 431

(56) References Cited

U.S. PATENT DOCUMENTS

| | | | |
|---|---|---|---|
| 2,707,079 A | * | 4/1955 | Little et al. ............. 237/12.3 B |
| 3,589,206 A | * | 6/1971 | Herbon ....................... 454/121 |
| 4,355,752 A | * | 10/1982 | Antoine ........................ 165/42 |
| 4,616,164 A | * | 10/1986 | Kenny et al. ................. 318/15 |
| 5,281,049 A | * | 1/1994 | Holt ........................... 137/863 |
| 5,338,249 A | * | 8/1994 | Hildebrand et al. ......... 454/121 |
| 5,797,585 A | * | 8/1998 | Auvity ........................ 251/229 |
| 5,860,321 A | * | 1/1999 | Williams et al. ............... 74/143 |
| 5,901,943 A | * | 5/1999 | Tsunoda ...................... 251/294 |
| 6,209,404 B1 | * | 4/2001 | Le ............................... 454/69 |
| 6,254,474 B1 | * | 7/2001 | Davidsson ............. 237/12.3 A |

FOREIGN PATENT DOCUMENTS

JP      Y2-7-40402      9/1995

* cited by examiner

*Primary Examiner*—Harold Joyce
*Assistant Examiner*—Derek S. Boles
(74) *Attorney, Agent, or Firm*—Harness, Dickey & Pierce, PLC

(57) ABSTRACT

In a vehicle air conditioner having manually operated operation members of an air-conditioning operation panel, rotation shafts of an air mixing door and a mode switching rotary door are disposed in a vehicle front-rear direction, so that an axial direction of the rotation shafts of the doors is made the same as that of rotation shafts of the operation members of the air-conditioning operation panel. Accordingly, operation force of the operation members can be directly transmitted to the rotation shafts of the doors by a simple structure.

19 Claims, 16 Drawing Sheets

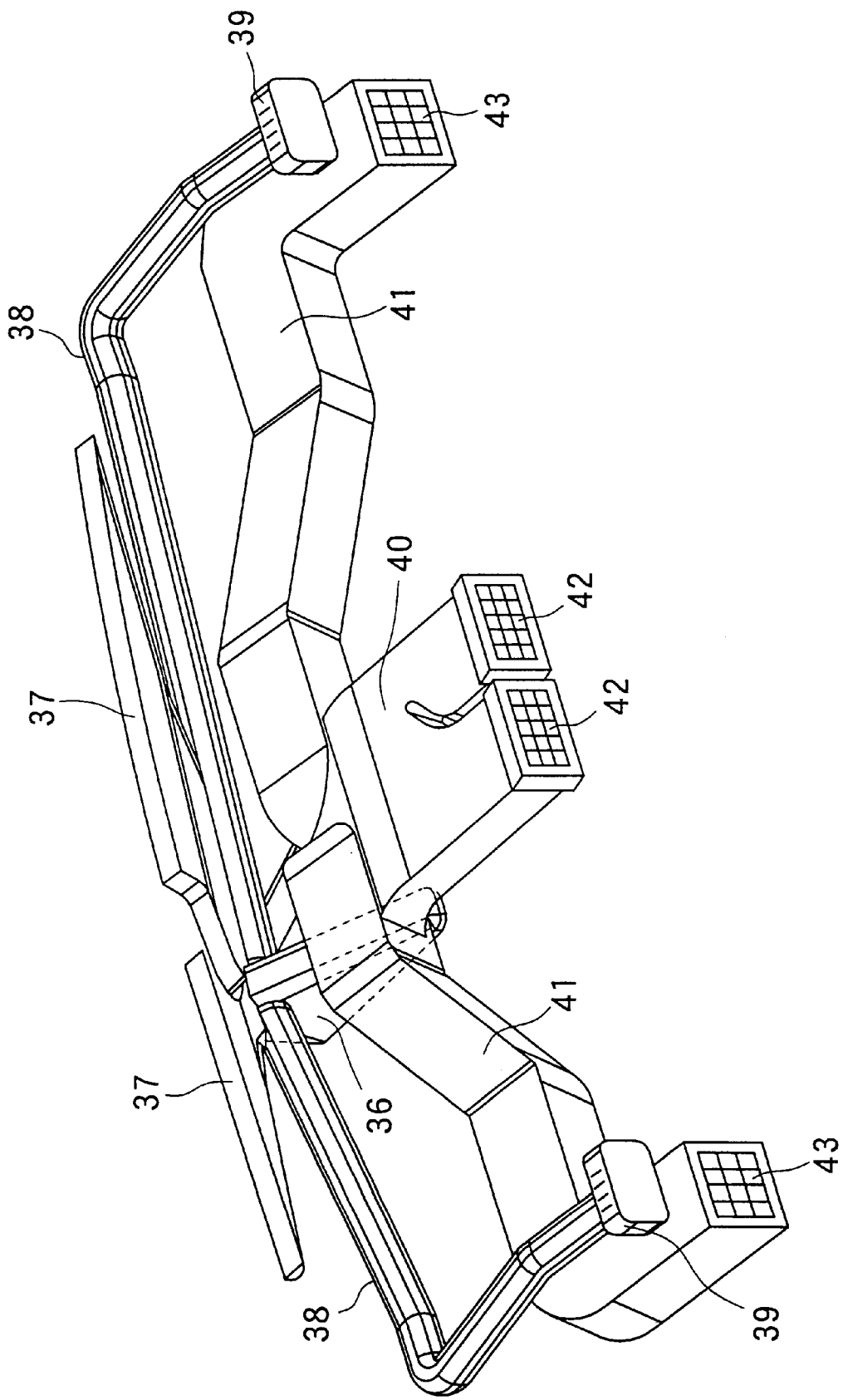

VEHICLE AIR CONDITIONER WITH MANUALLY OPERATED OPERATION MEMBER

CROSS-REFERENCE TO RELATED APPLICATION

This application is related to Japanese Patent Application No. 2000-241534 filed on Aug. 9, 2000, the contents of which are hereby incorporated by reference.

BACKGROUND OF THE INVENTION

1. Field of the Invention

The present invention relates to a manual operation mechanism for an air flow adjustment door disposed in an air conditioning unit of a vehicle air conditioner.

2. Description of Related Art

In a conventional vehicle air conditioner described in JP-Y2-7-40402, a rotation shaft of an air flow adjustment door is connected to an operation member of an air-conditioning operation panel through a cable, so that the air flow adjustment door is operated through the cable by manually operating the operation member of the air-conditioning operation panel. Because a manual operation force of the operation member of the air-conditioning operation panel is transmitted to the air flow adjustment door through the cable, a cable connection operation is need to be performed in a small space after an air conditioning unit is mounted within an instrument panel at a vehicle front side in a passenger compartment.

In addition, because the cable is constructed by inserting a core line portion into an outer pipe, a cable bending angle may be changed in the cable connection operation, and a cable assemble error may be caused. Thereby, the air flow adjustment door is not accurately operated, and an air leakage may be caused. Further, when the cable bending angle is small, a friction between the core line portion and the outer pipe is increased, and a door operation force is increased.

SUMMARY OF THE INVENTION

In view of the foregoing problems, it is an object of the present invention to provide a vehicle air conditioner in which a manual operation force applied to an operation member of an air-conditioning operation panel is directly transmitted to an adjustment door of an air conditioning unit with a simple structure.

According to the present invention, in a vehicle air conditioner, an air conditioning unit for adjusting an air state to be blown into the passenger compartment has an adjustment door for adjusting an air flow and a first rotation shaft for rotating the adjustment door. On the other hand, an air-conditioning operation panel has a manually operated operation member and a second rotation shaft rotated by the operation member. The first rotation shaft and the second rotation shaft are disposed on the same direction in such a manner that an operation force of the operation member transmits from the second rotation shaft to the first rotation shaft. Because the axial direction of the first rotation shaft is the same as that of the second rotation shaft, a rotation displacement of the second rotation shaft can be directly transmitted to the first rotation shaft without using a cable. Accordingly, a complex cable connection operation is unnecessary, and production cost can be reduced. Further, it can prevent an operation error of the adjustment door, due to a cable connection error, and it can prevent a door operation force from being increased due to a friction in the cable.

Preferably, the operation member is a rotatably operated rotation member directly connected to the second rotation shaft. Therefore, the second rotation shaft can be directly rotated by the rotation operation of the operation member. The second rotation shaft includes an input rotation shaft disposed to be rotatable by a rotation operation of the operation member, and an output rotation shaft which rotates by a rotation of the input rotation shaft through a gear wheel. Further, the second rotation shaft is disposed in such a manner that an operation force of the operation member is transmitted from the output rotation shaft to the first rotation shaft. Accordingly, the position of the operation member can be set to be offset from the position of the output rotation shaft, and an arrangement position of the air-conditioning operation panel can be readily set.

Preferably, the first rotation shaft has an axial line positioned on the same as that of the second rotation shaft, and the second rotation shaft is directly connected to the first rotation shaft. Therefore, the second rotation shaft can be directly connected to the first rotation shaft by a simple structure. Alternatively, the axial line of the first rotation shaft can be offset from that of the second rotation shaft. In this case, the arrangement position of the air-conditioning operation panel can be readily set.

Preferably, the air-conditioning operation panel is attached to the air conditioning unit to construct an integrated member, and the integrated member is mounted on the vehicle. Because the air-conditioning operation panel and the air conditioning unit are mounted on the vehicle after being integrated beforehand, assembling steps of the air conditioner on the vehicle can be reduced.

BRIEF DESCRIPTION OF THE DRAWINGS

Additional objects and advantages of the present invention will be more readily apparent from the following detailed description of preferred embodiments when taken together with the accompanying drawings, in which:

FIG. 4 is a schematic perspective view showing an air duct arrangement of the air conditioner according to the first embodiment;

DETAILED DESCRIPTION OF THE PRESENTLY PREFERRED EMBODIMENTS

Figure 1:
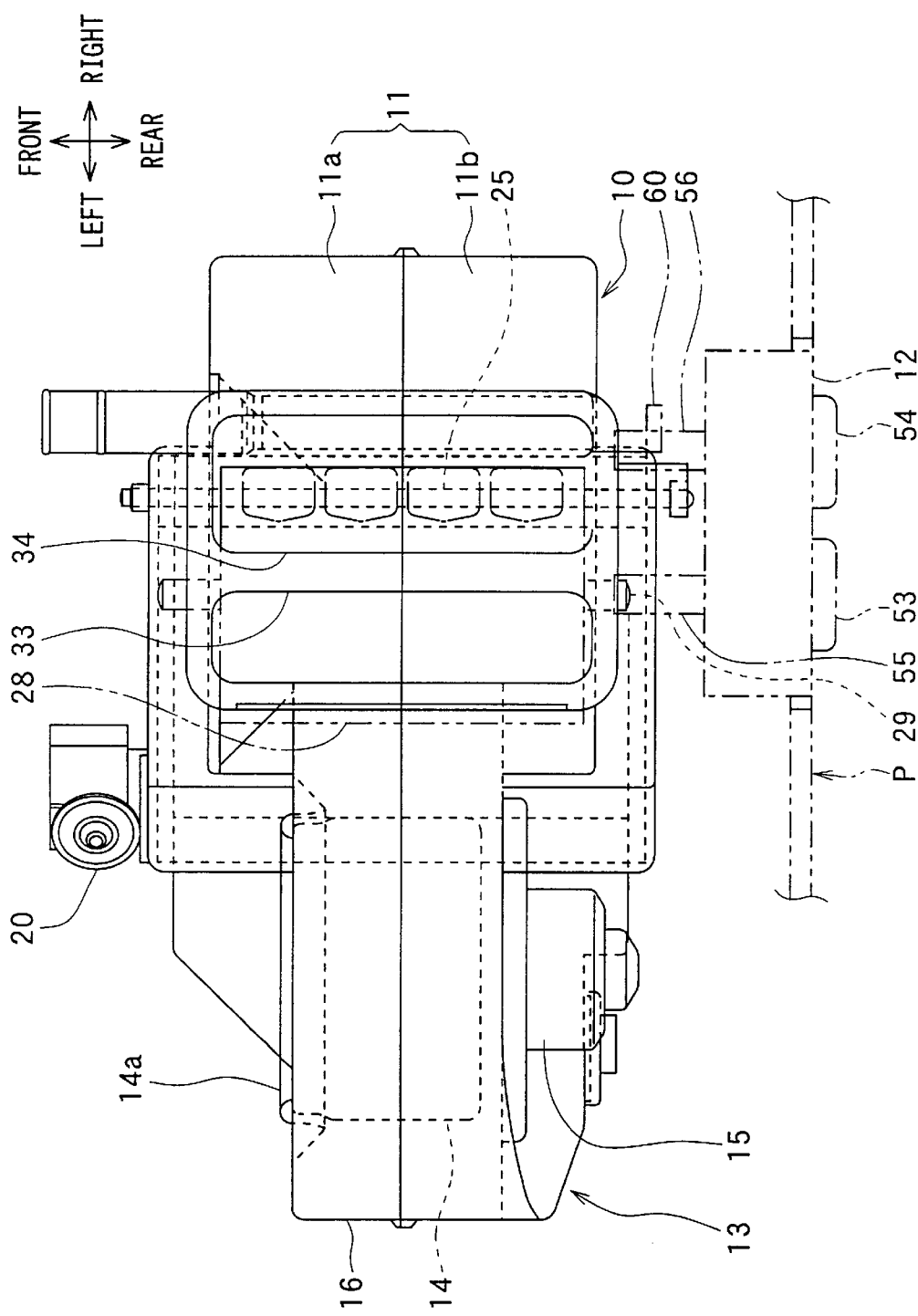
FIG. 1 is a top view of a vehicle air conditioner according to a first preferred embodiment of the present invention.

Preferred embodiments of the present invention will be described hereinafter with reference to the accompanying drawings.

A first preferred embodiment of the present invention will be now described with reference to FIGS. 1–6. An air conditioner for a vehicle includes an air conditioning unit 10 and an air-conditioning operation panel 12. The air conditioning unit 10 including a blower 13 is disposed inside an instrument panel P provided on a vehicle front side in a passenger compartment, at an approximate center in a vehicle right-left direction (vehicle width direction). The air conditioner is mounted on the vehicle to correspond to an arrangement state in FIGS. 1–3, in a vehicle front-rear direction, in a vehicle up-down direction and in the vehicle right-left direction.

The air conditioning unit 10 includes a case 11 made of a resin material such as polypropylene. The case 11 can be divided into both division cases 11a, 11b in the vehicle front-rear direction, and the division cases 11a, 11b are integrally fastened using a fastening member such as a metal spring clip to define therein an air passage. In the air conditioning unit 10, a blower portion, a heat-exchanging portion and a mode switching portion are integrally disposed within the case 10, as described later.

Figure 2:
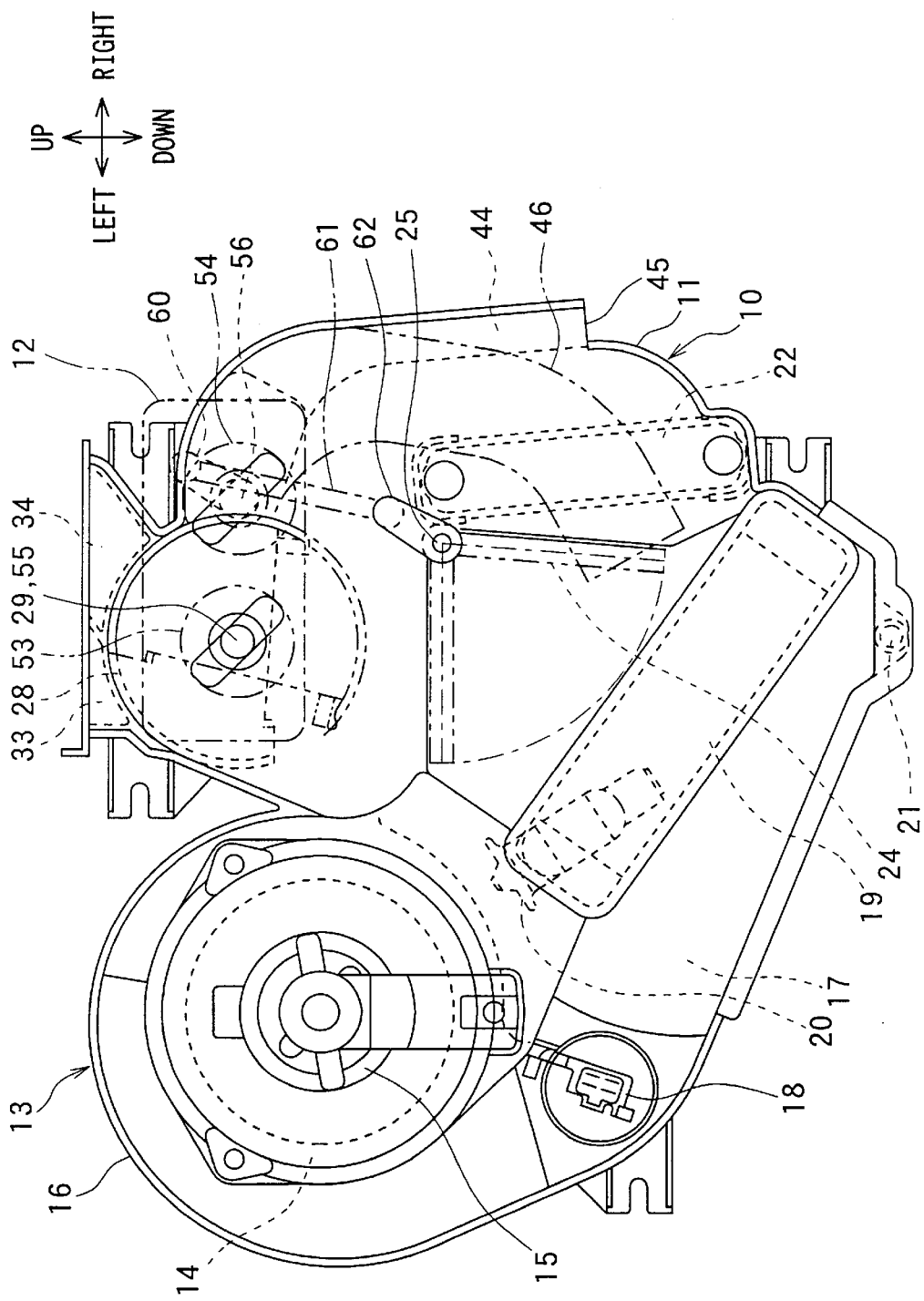
FIG. 2 is a front view of the air conditioner according to the first embodiment.

As shown in FIG. 2, an air-conditioning operation panel 12 is disposed on a vehicle rear side from the air conditioning unit 10 at an upper side position of the air conditioning unit 10, so that an operation surface of the air-conditioning operation panel 12 is substantially parallel to the vehicle right-left direction. Further, the air-conditioning operation panel 12 is disposed so that the operation surface of the air-conditioning operation panel 12 is positioned substantially on the same surface as the instrument panel P in the vehicle front-rear direction. The air-conditioning operation panel 12 will be described later in detail with reference to FIGS. 5 and 6.

In the first embodiment, the air conditioner is mounted on a vehicle having a right steering wheel, for example. Accordingly, the driver's seat is positioned at a vehicle right side of the instrument panel P within the passenger compartment, and the front-passenger's seat is positioned at a vehicle left side of the instrument panel P within the passenger compartment. The blower 13 is disposed at the vehicle left side (front-passenger's seat side) in the air conditioning unit 10. The blower 13 includes a centrifugal multi-blade blower fan (sirocco fan) 14, a fan motor 15 driving the blower fan 14, and a scroll casing 16 accommodating the blower fan 14. The scroll casing 16 is integrally molded with the division cases 11a, 11b of the case 11.

The blower 13 is disposed, so that an axial direction of the blower fan 14 and the motor 15 is positioned in the vehicle front-rear direction, and the blower fan 14 is provided at a vehicle front side of the motor 15. A suction port 14a is provided in the scroll casing 16 at a vehicle front side of the blower fan 14, and the suction port 14a is connected to an inside/outside air switching box (not shown) so that inside air or outside air is sucked into the suction port 14a.

An air passage 17 is provided at a bottom side within the air-conditioning case 11 to be tilted from an air outlet of the scroll casing 16 downwardly toward a vehicle right side. Further, as shown in FIG. 2, an electrical resistor 18 for adjusting a rotation speed of the motor 15 is disposed within an outlet passage of the scroll casing 16. Therefore, the electrical resistor 18 is effectively cooled by air blown from the blower fan 14.

An evaporator 19 (cooling heat exchanger) is disposed at a lowest side position within the case 11. The evaporator 19 is disposed, so that refrigerant compressed in a compressor (not shown) is decompressed in an expansion valve 20 of a refrigerant cycle, and thereafter flows into the evaporator 19. Accordingly, low-pressure refrigerant flowing through the evaporator 19 absorbs heat from air to be evaporated, so that air passing through the evaporator 19 is cooled.

The evaporator 19 is disposed to be tilted from a horizontal surface by a predetermined angle along the tilted direction of the air passage 17. That is, the evaporator 19 is tilted so that a right side end of the evaporator 19 becomes lower than a left side end of the evaporator 19. The evaporator 19 includes a heat-exchanging portion 19a in which plural flat tubes and plural corrugated fins are alternatively stacked on each other and are brazed. Air blown by the blower fan 14 flows into a lower space (air passage 17) under the evaporator 19, and passes through the heat-exchanging portion 19a of the evaporator 19 from below upwardly as shown by arrow A in FIG. 3.

Condensed water generated on the evaporator 19 collects a tilted lower end side of the evaporator 19, and is smoothly discharged to an outer side from a drain port provided at a lower position under the tilted lower end of the evaporator 19.

Within the case 11, a heater core 22 is disposed approximately vertically on a downstream air side of the evaporator 19 at a tilted lower end side (right side of the evaporator 19). That is, the heater core 22 is disposed substantially vertically on an upper side of the evaporator 19 at a vehicle right end side (tilted lower end side) of the evaporator 19 so that air from the evaporator 19 passes through the heater core 22 from a left side of the heater core 22 to a right side of the heater core 22. The heater core 22 is a heating heat exchanger for heating air using hot water (engine-cooling water) from a vehicle engine as a heating source.

Similarly to the evaporator 19, the heater core 22 includes a heat-exchanging portion 22a in which plural flat tubes and plural corrugated fins are alternatively stacked on each other and are brazed. Air from the cooling heat exchanger 19 passes through the heat-exchanging portion 22a from the left side toward the right side as shown by arrow B in FIG. 3.

Because the heater core 22 is disposed at the upper right side of the evaporator 19, a cool air bypass passage 23 is formed within the case 11 at the upper left side of the evaporator 19. Accordingly, air from the evaporator 19 passes through the cool air bypass passage 23 as shown by arrow C in FIG. 3 while bypassing the heater core 22. A rotation shaft 25 of a plate-like air mixing door 24 is disposed around an upper end of the heater core 22 at a side of the cool air bypass passage 23.

An axial direction of the rotation shaft 25 of the air mixing door 24 is toward in the vehicle front-rear direction. Both ends of the rotation shaft 25 are rotatably held in bearing holes of the case 11. One end of the plate-like air mixing door 24 is connected to the rotation shaft 25, so that the air mixing door 24 is rotatable around the rotation shaft 25 between the solid line position D in FIG. 3 and the chain line position E in FIG. 3.

Figure 3:
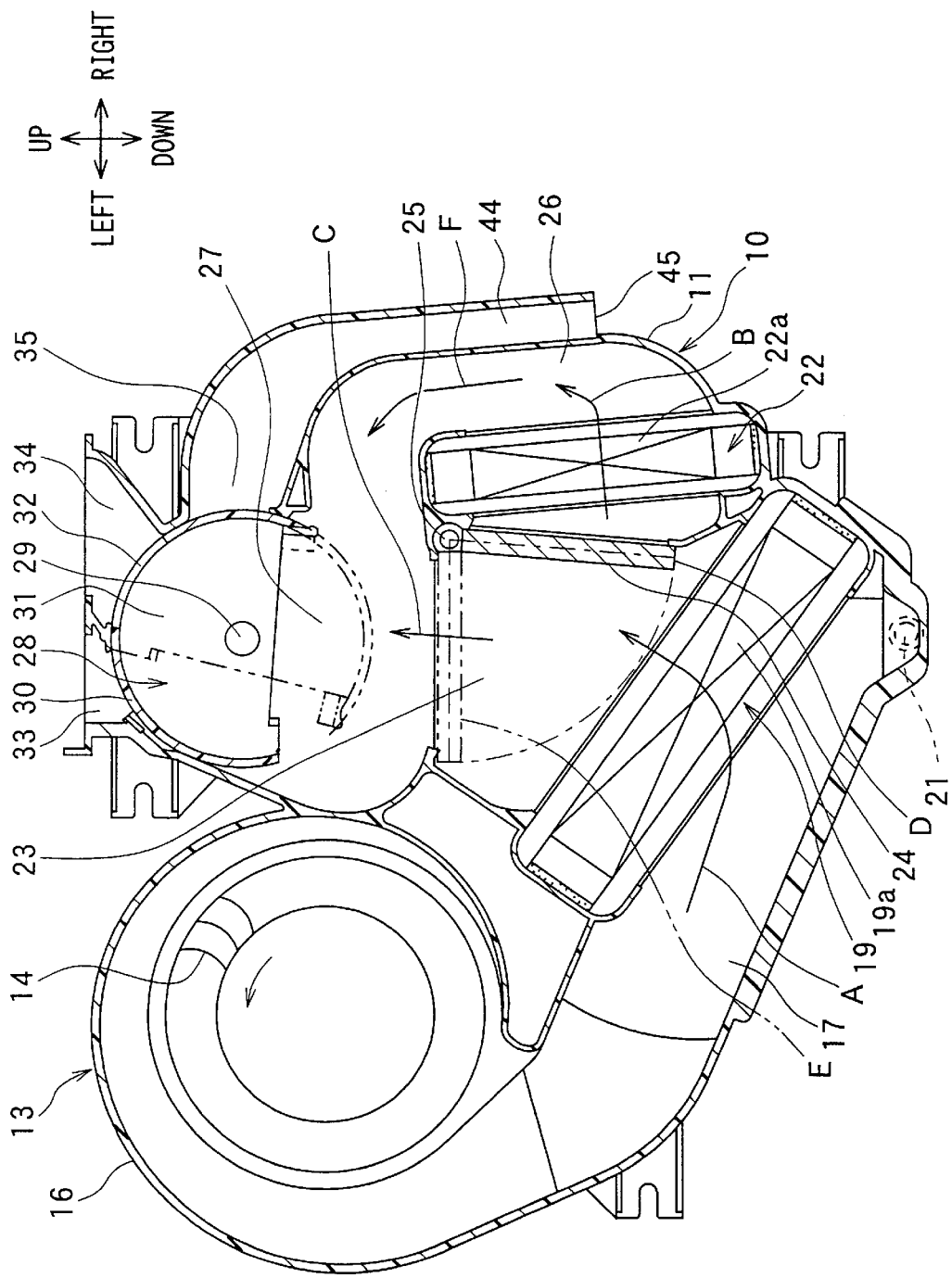
FIG. 3 is a schematic vertical sectional view showing an air conditioning unit of the air conditioner according to the first embodiment.

The solid line position D of the air mixing door 24 is a maximum cooling position where an air passage of the heat-exchanging portion 22a of the heater core 22 is fully closed, and the chain line position E of the air mixing door 24 in FIG. 3 is a maximum heating position where the cool air bypass passage 23 is fully closed. When the air mixing door 24 opens the air passage of the heat-exchanging portion 22a of the heater core 22, air after passing through the evaporator 19 passes through the heat-exchanging portion 22a of the heater core 22 from the vehicle left side to the vehicle right side as shown by arrow B in FIG. 3.

The air mixing door 24 is disposed to adjust a ratio between an air amount passing through the heat-exchanging portion 22a of the heater core 22 and an air amount passing through the cool air bypass passage 23 while bypassing the heater core 22, so that temperature of air blown into the passenger compartment can be adjusted.

A warm air passage 26 through which warm air after passing through the heater core 22 flows upwardly is provided in the case 11. The warm air passage 26 is bent at an upper side from the heater core 22 to be bent toward a vehicle left side. Further, an air mixing portion 27 is provided at an upper side of the evaporator 19 and the heater core 22 so that warm air from the warm air passage 26 and the cool air from the cool air bypass passage 23 are mixed in the air mixing portion 27.

At a top side position around the air mixing portion 27 within the air-conditioning case 11, a rotary door 28 is rotatably disposed to be used as a mode switching door. A rotation shaft 29 of the rotary door 28 is disposed to be positioned in the vehicle front-rear direction, similarly to the rotation shaft 25. The rotation shaft 29 is disposed in the rotary door 28 at an approximate center in the vehicle right-left direction. The rotary door 28 has a door surface 30 positioned at a predetermined radial outside position separated from the rotation shaft 29, and is formed into a semi-cylinder shape integrally rotated with the rotation shaft 29. The door surface 30 is connected integrally with the rotation shaft 29 by both side plates positioned at both sides in the vehicle front-rear direction (axial direction). A communication hole 32 is provided in the door surface 30 of the rotary door 28.

A defroster opening 33, a face opening 34 and a foot opening 35 are opened in the air-conditioning case 11 at positions around an outer peripheral side of the rotary door 28. Here, the defroster opening 33 is positioned at an upper left side of the air-conditioning case 11, the face opening 34 is positioned at a right side from the defroster opening 33. Further, the foot opening 35 is positioned at a lower side of the face opening 34.

FIG. 4 shows an air duct arrangement connected to the defroster opening 33 and the face opening 34. A defroster duct 36 is connected to the defroster opening 33, and defroster air outlets 37 from which air is blown toward a front windshield are provided in the defroster duct 36 at a downstream air end. In addition, left and right side defroster ducts 38 are connected to the defroster duct 36 so that air is blown toward left and right side windshields from side defroster outlets 39 of the left and right side defroster ducts 38.

On the other hand, a center face duct 40 and right and left side face ducts 41 are connected to the face opening 34, so that air is blown toward the face area of a passenger in the passenger compartment from center face air outlets 42 and side face outlets 43 provided at downstream ends of the center face duct 40 and the left and right side face ducts 41. Here, the left side face duct 41 extending in the vehicle left-right direction is disposed to cross with the defroster duct 36 at an upper side position of the defroster duct 36.

The foot opening 35 is positioned at a lower side of the face opening 34 on the vehicle right side of the rotary door 28, and can directly communicate with a foot air passage 44 placed at a most right side in the air-conditioning case 11. Accordingly, air can be blown toward the foot area of the right seat side passenger (driver) from a right foot air outlet 45 at a downstream end of the foot air passage 44. Further, as shown in FIG. 2, a foot air duct 46 is connected to the foot opening 35 so that air can be blown toward the foot area on the left seat side (front passenger's seat side) from a left foot air outlet (not shown) provided at a downstream end of the foot air duct 46.

Next, the air-conditioning operation panel 12 will be now described with reference to FIGS. 5A–5C and 6. The air-conditioning operation panel 12 of the vehicle air conditioner is formed into a lateral elongated box shape. The air-conditioning operation panel 12 is constructed by a body case 50 and a cover member 51 for closing a back side opening of the body case 50. Elastic engagement claws 51a are provided in the cover member 51, and the cover member 51 is assembled to the body case 50 using the elastic engagement claws 51a. However, the cover member 51 may be fixed to the body case 50 using a fastening member such as a screw.

Three attachment portion 52 are provided in the body case 50 (or cover member 51) at three positions, and tapping screws (not shown) are inserted into attachment holes 52a of the attachment portions 52, respectively. The taping screws are fastened to attachment boss portions provided on a vehicle rear side surface of the case 11, so that the air-conditioning operation panel 12 is directly attached to the air conditioning unit 10. Accordingly, the air-conditioning panel 12 and the air conditioning unit 10 can be integrated beforehand, and the integrated structure can be mounted inside the instrument panel of the vehicle. However, the air-conditioning panel 12 can be directly attached to the case 11 using elastic engagement claws similarly to the elastic engagement claws 51a, made of an elastic material such as a resin.

A mode switching operation member 53 and a temperature adjustment operation member 54 are provided on the air-conditioning operation panel 12. Each of the operation members 53, 54 is a rotation member rotated manually. One end sides of rotation shafts 55, 56 are press-fitted into the operation members 53, 54, respectively, so that the rotation shafts 55, 56 are integrally connected to the operation members 53, 54, respectively. Each of the press-fitted parts of the rotation shafts 55, 56 is formed into a not-circular sectional shape such as a D-shape in cross-section, so that a rotation of the press-fitted parts can be accurately prevented.

Figure 5A:
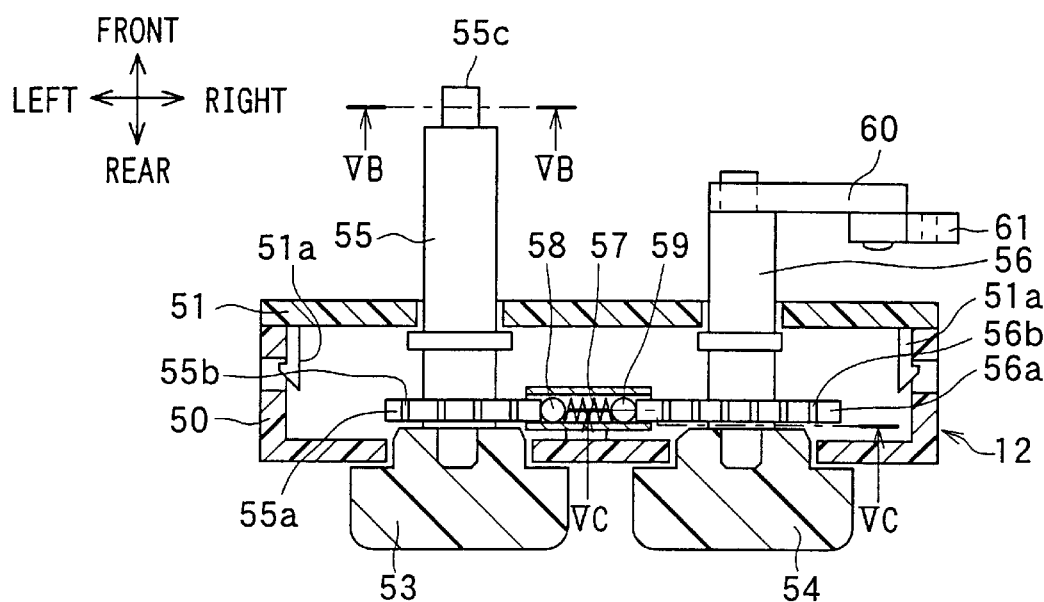
FIG. 5A is a sectional view showing an air-conditioning operation panel according to the first embodiment.

Circular plate portions 55a, 56a are provided in the rotation shafts 55, 56, respectively, at positions inside the air-conditioning operation panel 12. In addition, plural recesses 55b for adjusting a rotation position are provided on an outer peripheral surface of the circular plate portion 55a, and plural recesses 56b for adjusting a rotation position are provided on an outer peripheral surface of the circular plate portion 56a. As shown in FIG. 5A, balls 58, 59 are pressed onto the outer peripheral surfaces of the circular plate portions 55a, 56a by spring force of a spring 57. Accordingly, every time the balls 58, 59 are press-inserted into the recesses 55b, 56b, rotation operation force of both the operation member 53, 54 are increased, so that both rotation operations of the operation members 53, 54 are suitably accurately performed.

Figure 5B:
FIG. 5B is a cross-sectional view taken along line VB—VB in FIG. 5A.
Figure 5C:
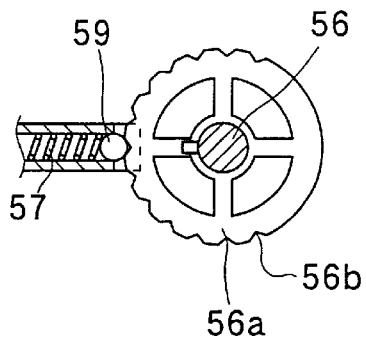
FIG. 5C is a cross-sectional view taken along line VC—VC in FIG. 5A.

The rotation shaft 55 of the operation member 53 and the rotation shaft 29 of the rotary door 28 are disposed so that the axial directions of both the rotation shafts 55, 29 are corresponded with each other, as shown in FIGS. 1 and 2. Further, as shown in FIGS. 5A–5C, a small-diameter portion 55c having a D-shaped cross section is formed at a vehicle front side end portion of the rotation shaft 55 of the operation member 53. On the other hand, an insertion hole (not shown) having a D-shaped section is provided at a vehicle rear side end portion of the rotation shaft 29 of the rotary door 28, so that the small-diameter portion 55c is inserted into the D-shaped insertion hole of the rotation shaft 29.

Accordingly, the small-diameter portion 55c of the rotation shaft 55 of the operation member 53 can be directly press-fitted into the insertion hole of the rotation shaft 29 of the rotary door 28. Because the small-diameter portion 55c of the rotation shaft 55 and the insertion hole for inserting the small-diameter portion 55c have the D-shaped sections, a rotation between both the rotation shafts 55, 29 can be accurately prevented. Thus, by a manual rotation operation of the operation member 53, the rotary door 28 can be directly rotated.

Figure 6:
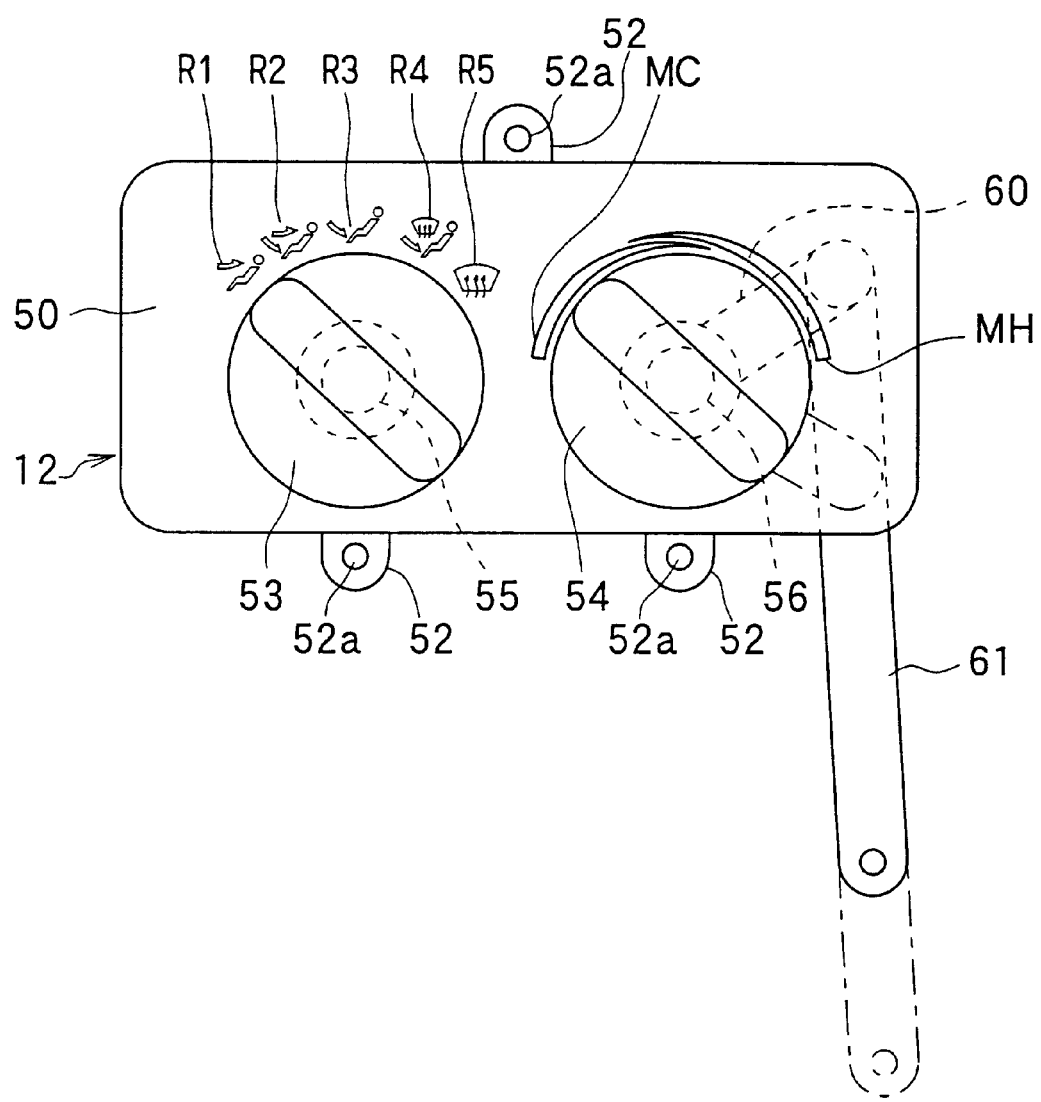
FIG. 6 is a front view of the air-conditioning operation panel according to the first embodiment.

In the first embodiment of the present invention, as shown in FIG. 6, by the rotation operation of the operation member 53, the rotary door 28 can be rotated to five air outlet mode positions. That is, when the operation member 53 is rotated to a position R1 in FIG. 6, the rotary door 28 is operated to a face mode position, so that a face mode, where the face opening 34 is fully opened, is set. When the operation member 53 is rotated to a position R2 in FIG. 6, the rotary door 28 is operated to a bi-level mode position, so that a bi-level mode, where both the face opening 34 and the foot opening 35 are opened, is set. When the operation member 53 is rotated to a position R3 in FIG. 6, the rotary door 28 is operated to a foot mode position, so that a foot mode, where the foot opening 35 is fully opened and the defroster opening 33 is slightly opened, is set. When the operation member 53 is rotated to a position R4 in FIG. 6, the rotary door 28 is operated to a foot/defroster mode position, so that a foot/defroster mode, where both the foot opening 35 and the defroster opening 33 are opened by an approximately equal opening degree, is set. When the operation member 53 is rotated to a position R5 in FIG. 6, the rotary door 28 is operated to a defroster mode position, so that a defroster mode, where only the defroster opening 33 is fully opened, is set.

On the other hand, the rotation shaft 25 of the air mixing door 24 is disposed at a lower side relative to the rotation shaft 56 of the temperature adjustment operation member 54. Accordingly, axial lines of both the rotation shafts 56, 24 are offset from each other. In the first embodiment, both the rotation shafts 56, 24 are connected by a link member (link mechanism). Specifically, one end of a link lever 60 is connected to a front top end portion of the rotation shaft 56 of the operation member 54, and the other end of the link lever 60 is rotatably connected to a top end of a connection link 61 extending in the vehicle up-down direction. On the other hand, one end of a link lever 62 (see FIG. 2) is connected to a vehicle rear side end of the rotation shaft 25 of the air mixing door 24, and the other end of the link lever 62 is rotatably connected to a lower end of the connection link 61.

Accordingly, when the temperature adjustment operation member 54 rotates and operates, the rotation displacement of the operation member 54 transmits to the rotation shaft 25 through the link lever 60, the connection link 61 and the link lever 62, so that the air mixing door 24 can be rotated.

In FIG. 6, when the operation member 54 is rotated at the left end rotation position MC, the air mixing door 24 is operated to the maximum cooling position indicated by the solid line position D of FIG. 3. On the other hand, when the operation member 54 is rotated at the right end rotation position MH, the air mixing door 24 is operated to the maximum heating position indicated by the chain line position E of FIG. 3. Further, when the operation member 54 is rotated at a position between the rotation position MC and the rotation position MH, the air mixing door 24 is opened by a predetermined opening degree.

In FIG. 6, as the operation member of the air-conditioning operation panel 12, only the mode switching operation member 53 and the temperature adjustment operation member 54 are indicated. However, actually, the other operation members such as an inside/outside air switching operation member for operating the inside/outside air switching door, an air amount switching operation member for performing a switching operation of the electrical resistor 18 of the blower 13 and an air-conditioning switch for switching an operation of the compressor of the refrigerant cycle can be provided on the air-conditioning operation panel 12.

Next, operation of the vehicle air conditioner according to the first embodiment will be now described. When the blower 13 is operated by the air amount switching operation member, and when the compressor of the refrigerant cycle is operated by the air-conditioning switch, air blown from the blower 13 is cooled and dehumidified in the evaporator 19. Thereafter, based on the operation position of the air mixing door 24, a part of air from the evaporator 19 passes through the heater core 22 to be heated as shown by the arrow B in FIG. 3, and the other part of air from the evaporator 19 passes through the bypass passage 23 as shown by the arrow C in FIG. 3. Warm air from the heater core 22 and cool air from the bypass passage 23 are mixed in the air mixing portion 27 so that conditioned air having a predetermined temperature can be obtained. Thereafter, conditioned air is blown into the passenger compartment through at least one of the air openings 33–35 selectively opened by the rotary door 36.

According to the first embodiment of the present invention, the rotation shafts 55, 56 of the operation members 53, 54 of the air-conditioning operation panel 12 and the rotation shafts 25, 29 of the doors 24, 28 of the air conditioning unit 10 are placed to extend in the same direction, that is, in the vehicle front-rear direction. Further, the rotation shaft 29 of the rotary door 28 is directly connected to the rotation shaft 55 of the mode switching operation member 53 as shown in FIG. 1. Accordingly, by the rotation operation of the operation member 53, the rotary door 28 can be directly rotated, and an air outlet mode can be readily accurately selected.

On the other hand, the axial line of the rotation shaft 56 of the temperature adjustment operation member 54 is offset from that of the rotation shaft 25 of the air mixing door 24. However, the axial line of the rotation shaft 56 and the axial line of the rotation shaft 25 of the temperature adjustment air mixing door 24 are toward on the same direction, the rotation operation of the operation member 54 can be transmitted to the air mixing door 24 only through a simple link mechanism (60, 61, 62).

That is, according to the first embodiment of the present invention, the rotation shafts 55, 56 of the operation members 53, 54 of the air-conditioning operation panel 12 and the rotation shafts 25, 29 of the doors 24, 28 of the air conditioning unit 10 can be directly connected or can be connected by a simple link mechanism, for operating the doors 24, 28 of the air conditioning unit 10. Accordingly, it is unnecessary to perform a complicated cable connection operation, and a connection structure can be made simple. As a result, it can prevent a door operation error due to a cable connection error, and it can prevent door-operation force from being increased due to a friction in the cable.

In addition, because the air-conditioning operation panel 12 is directly attached to the air-conditioning case 11 of the air conditioning unit 10, an integrated structure of the air-conditioning operation panel 12 and the air conditioning unit 10 can be mounted inside the instrument panel P after the air-conditioning operation panel 12 and the air conditioning unit 10 are integrated.

Figure 7:
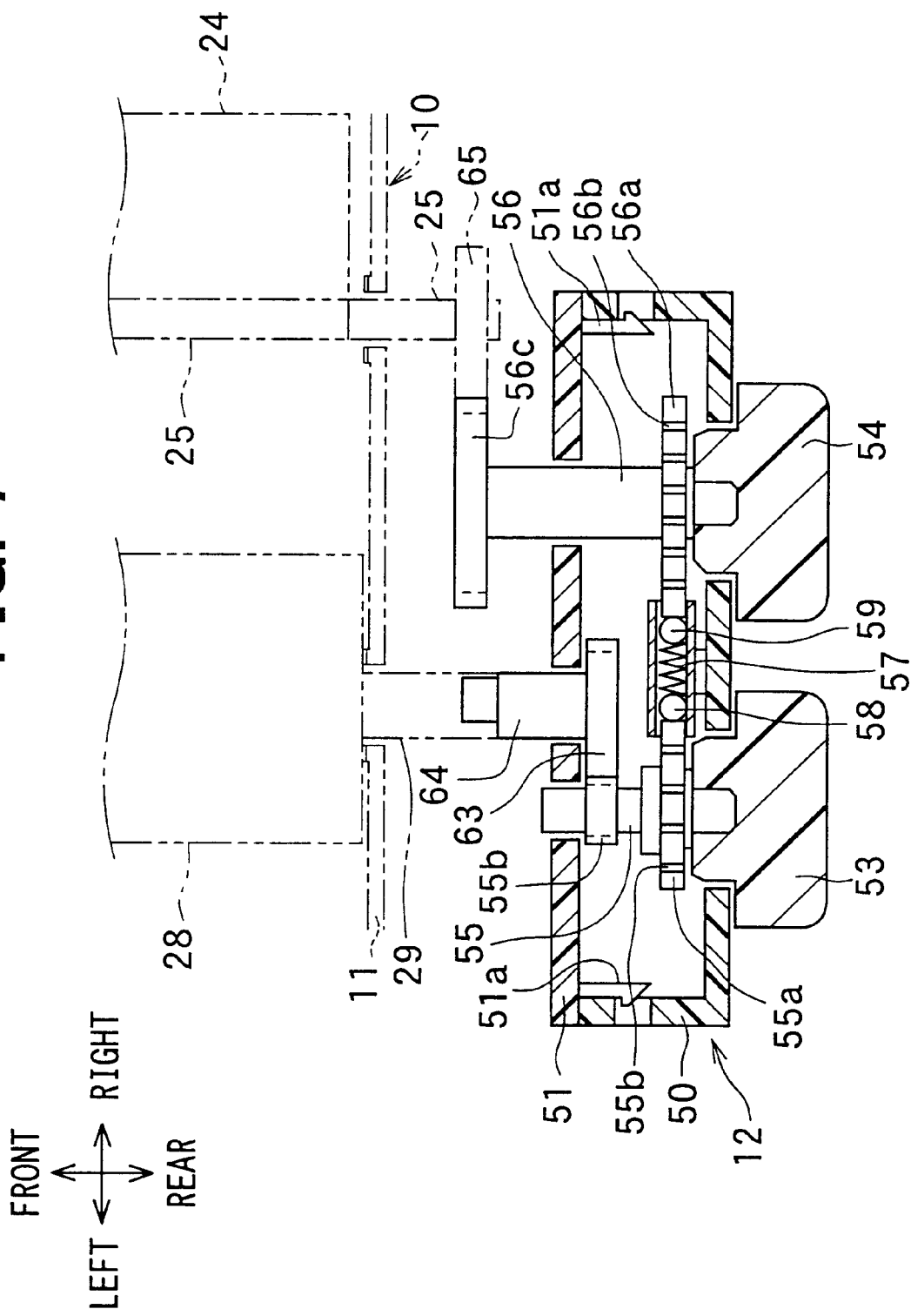
FIG. 7 is a sectional view showing an air-conditioning operation panel of a vehicle air conditioner according to a second preferred embodiment of the present invention.
Figure 8:
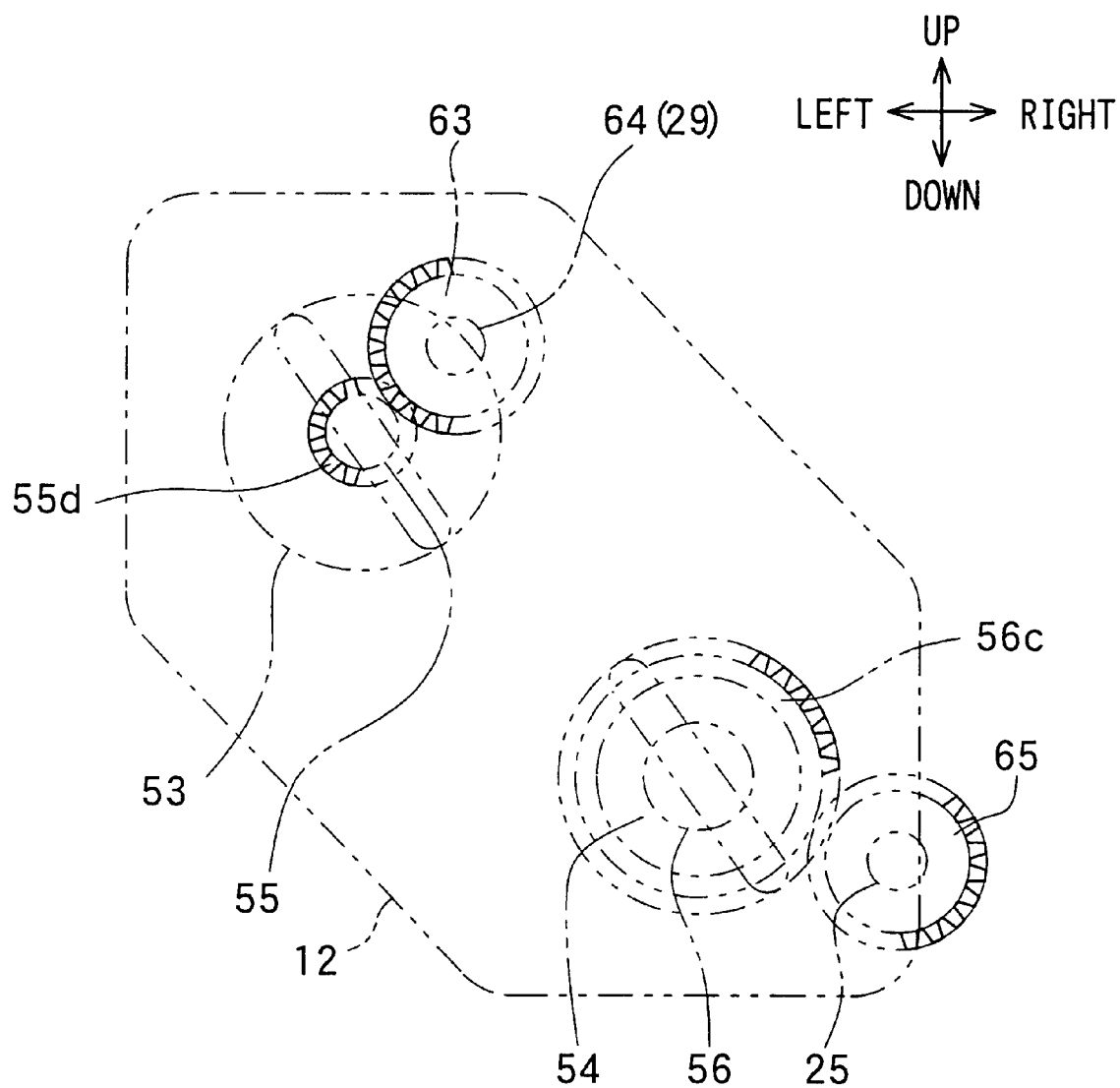
FIG. 8 is a schematic view showing an engagement state of a gear portion of the air-conditioning operation panel according to the second embodiment.

A second preferred embodiment of the present invention will be now described with reference to FIGS. 7 and 8. In the above-described first embodiment of the present invention, the axial line (shaft center line) of the rotation shaft 55 of the mode switching operation member 53 is made on the same as the axial line (shaft center line) of the rotation shaft 29 of the rotary door 28. However, in the second embodiment of the present invention, as shown in FIG. 7, both the axial lines of the rotation shafts 55, 56 of both the operation members 53, 54 are offset from that of the rotation shafts 25, 29 of the doors 24, 28 in the air conditioning unit 10, respectively.

In the second embodiment of the present invention, the axial lines of the rotation shafts 55, 56 and the axial lines of the rotation shafts 25, 29 are toward the same direction (e.g., the vehicle front-rear direction). The rotation shaft 55 of the mode switching operation member 53 and the rotation shaft 29 of the mode switching rotary door 28 are connected through a gear wheel, and the rotation shaft 56 of the temperature adjustment operation member 54 and the rotation shaft 25 of the temperature adjustment air mixing door 24 are connected through a gear wheel.

The rotation shaft 29 of the rotary door 28 is positioned relatively at a left upper side, and the rotation shaft 25 of the air mixing door 24 is positioned relatively at a right lower side, as shown in FIG. 2. Accordingly, in the second embodiment, the air-conditioning operation panel 12 is formed into a shape tilted from a left upper side to a right lower side, to correspond to the arrangement of the rotation shaft 29 of the rotary door 28 and the rotation shaft 25 of the air mixing door 24. Thereby, both the rotation shafts 55, 56 of both the operation member 53 can be disposed at positions around the rotation shafts 25, 29 of the doors 24, 28 of the air conditioning unit 10, respectively.

Further, a gear wheel 55d is formed integrally with the rotation shaft 55 (input side rotation shaft) of the mode switching operation member 53, and a gear wheel 63 engaging with the gear wheel 55d is formed integrally with a supplementary rotation shaft 64 (output side rotation shaft). Further, a vehicle front end portion of the supplementary rotation shaft 64 is integrally connected to the rotation shaft 29 of the rotary door 28.

On the other hand, a gear wheel 56c is formed integrally with a vehicle front top end of the rotation shaft 56 of the temperature adjustment operation member 54, and a gear wheel 65 engaged with the gear wheel 56c is formed integrally with the rotation shaft 25 of the air mixing door 24.

Accordingly, in the second embodiment of the present invention, the rotation operation of both operation member 53, 54 of the air-conditioning operation panel 12 can be transmitted to the doors 24, 28 of the air conditioning unit 10 through a gear mechanism. Further, an operation angle of the doors 24, 28 can be readily adjusted by a gear ratio of the gear mechanism.

In the second embodiment of the preset invention, the supplementary rotation shaft 64 is assembled to the rotation shaft 55 for the mode switching operation member 53. However, the supplementary rotation shaft 64 may be used for the temperature adjustment operation member 54. Alternatively, in the second embodiment, the supplementary rotation shaft 64 may be omitted from the gear mechanism of the mode switching operation member 53. In this case, the gear mechanism of the mode switching operation member 53 may be constructed similarly to the gear mechanism of the temperature adjustment operation member 54.

According to the second embodiment of the present invention, the rotation shafts 55, 56 of the operation members 53, 54 can be connected to the rotation shafts 29, 25 of the doors 28, 24, respectively, using the simple gear mechanisms.

Figure 9:
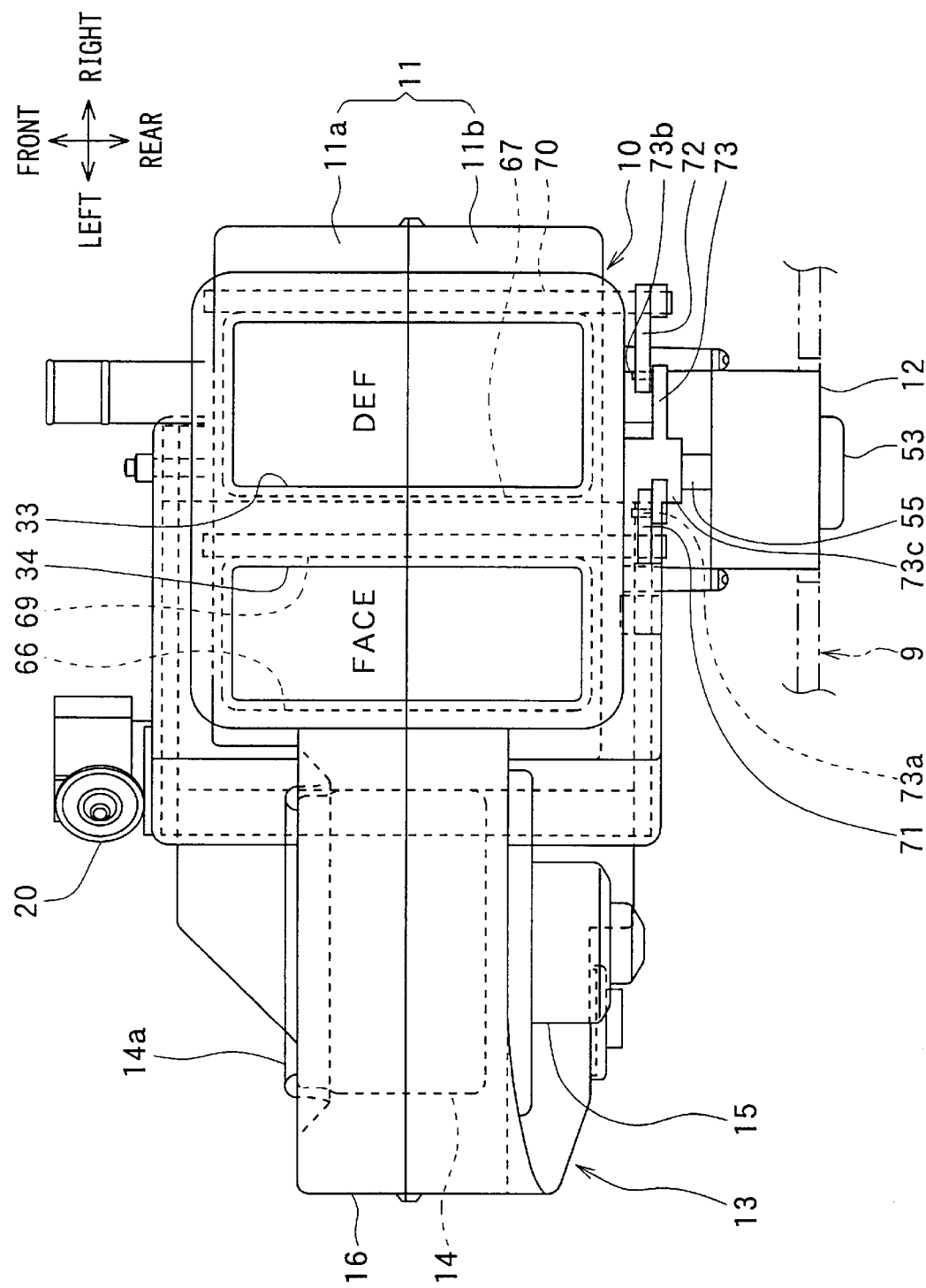
FIG. 9 is a top view showing a vehicle air conditioner according to a third preferred embodiment of the present invention.
Figure 10:
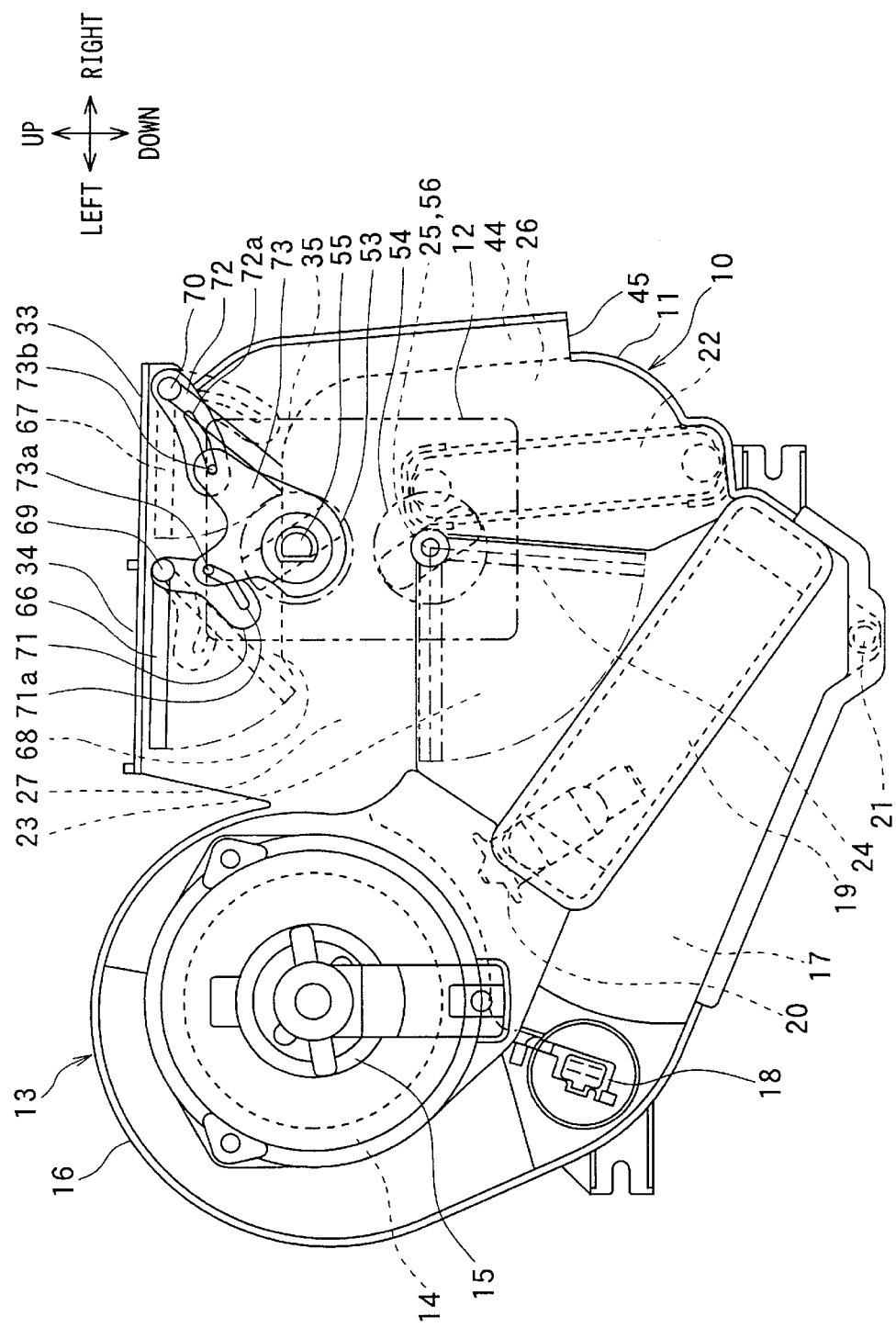
FIG. 10 is a front view showing an air conditioning unit of the air conditioner according to the third embodiment.

A third preferred embodiment of the present invention will be now described with reference to FIGS. 9–11. In the above-described first and second embodiments of the present invention, as the mode switching door, the semi-cylindrical rotary door 28 having the door surface 30 is used. However, in the third embodiment, as shown in FIGS. 9 and 10, as the mode switching door, both plate doors 66, 67 are used. By using both the plate doors 66, 67, the operation mechanism of both the operation members 53, 54 are changed as follows.

In the third embodiment, on the top surface of the case 11, the face opening 34 is provided at a vehicle left side, and the defroster opening 33 is provided at a vehicle right side, as shown in FIG. 9. Further, a foot opening 35 is provided at a lower side position of the defroster opening 33, as shown in FIG. 10. Further, the defroster opening 33 and the foot opening 35 are communicated with the air mixing portion 27 through a communication path 68.

A face plate door 66 is provided in a lower side space of the face opening 34 to be rotatable around a rotation shaft 69. When the face door 66 is rotated to the solid line position in FIG. 10, the face plate door 66 closes the face opening 34 and opens the communication path 68. On the other hand, when the face plate door 66 is rotated to the chain line position in FIG. 10, a face mode is set so that the face plate door 66 opens the face opening 34 and closes the communication path 68.

A defroster/foot switching plate door 67 is disposed in a lower side space of the defroster opening 33 to be rotatable around the rotation shaft 70. When the plate door 67 is rotated to the chain line position in FIG. 10, the defroster opening 33 is fully closed, and the foot opening 35 is fully opened. On the other hand, when the plate door 67 is rotated to the solid line position in FIG. 10, the foot opening 35 is fully closed, and the defroster opening 33 is fully opened.

The rotation shafts 69, 70 of both the plate doors 66, 67 are plated in the vehicle front-rear direction. Rear side ends of the rotation shafts 69, 70 are integrally connected to one side ends of link levers 71, 72, respectively. Further, engagement recesses 71a, 72a are provided in the link levers 71, 72, respectively.

Figure 11:
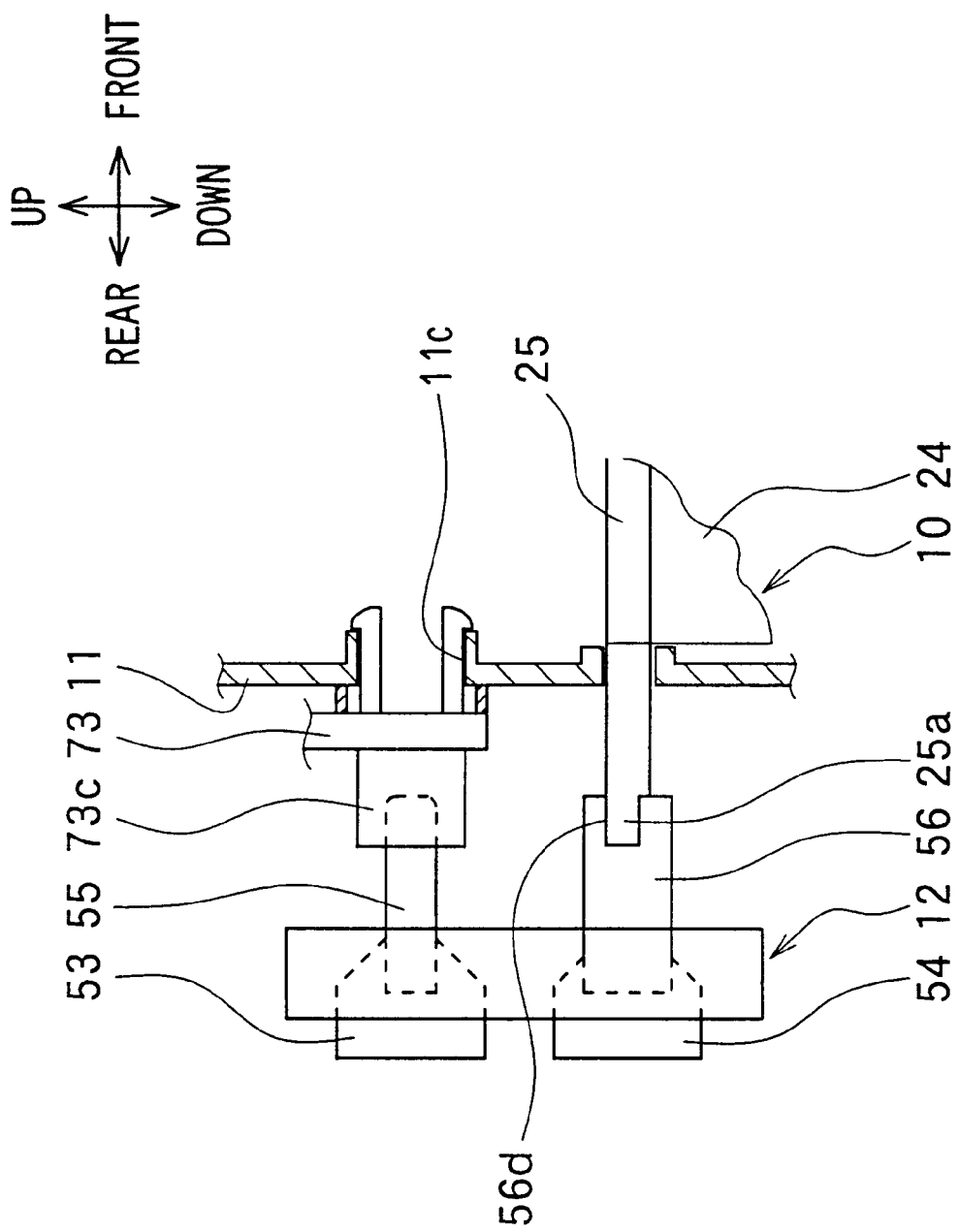
FIG. 11 is a partially-sectional side view showing a connection portion of a rotation shaft of an air-conditioning operation panel according to the third embodiment.

On the other hand, in the third embodiment, the air-conditioning operation panel 12 is formed into a vertical elongated shape extending in the vehicle up-down direction, and the mode switching operation member 53 is disposed at an upper side of the temperature adjustment operation member 54, as shown in FIG. 11. Further, the rotation shaft 55 of the operation member 53 is disposed in the vehicle front-rear direction, and a main link lever 73 is connected integrally with the rotation shaft 55. For example, in FIG. 11, the top end portion of the rotation shaft 55 is formed into a non-circular shape such as a D-shaped cross section, and is press-fitted into an insertion hole of a shaft portion 73c of the main link lever 73. In addition, the shaft portion 73c of the main link lever 73 is rotatably supported in a bearing hole 11c of the case 11.

A Y-shaped protrusion is formed in the main link lever 73, and pins 73a, 73b are provided in the Y-shaped protrusion to be slidably inserted into the engagement recesses 71a, 72a of the link lever 71, 72, respectively.

Accordingly, when the mode switching operation member 53 rotates, the main link lever 73 is rotated integrally with the mode switching operation member 53, and both the mode switching plate doors 66, 67 are operated by the rotation of the main link lever 73 through the engagement relationships between the pins 73a, 73b and the engagement recesses 71a, 72a in the link levers 71, 72. That is, relative to the rotation operation of the operation member 53, the engagement relationships are set, so that both the plate doors 66, 67 are rotated by a predetermined operation angle for switching one of the air outlet modes.

In the third embodiment, the temperature adjustment operation member 54 is disposed at a lower side in the air-conditioning operation member 12, and the axial line (shaft center line) of the rotation shaft 56 of the temperature adjustment operation member 54 is made on the same as the axial line (shaft center line) of the rotation shaft 25 of the air mixing door 24, so that the rotation shaft 56 of the temperature adjustment operation member 54 is directly connected to the rotation shaft 25 of the air mixing door 24. Specifically, as shown in FIG. 11, a small-diameter portion 25a having a non-circular shape such as a D-shape in cross section is formed at a vehicle rear side end of the rotation shaft 25 of the air mixing door 24, and an insertion hole 56d into which the small-diameter portion 25a is inserted is formed at a vehicle front side end of the rotation shaft 56 of the operation member 54. The small-diameter portion 25a of the rotation shaft 25 is press-fitted into the insertion hole 56d of the rotation shaft 56 of the operation member 54, so that the air mixing door 24 is integrally connected to the operation member 54 with a simple structure.

Thus, by the rotation operation of the temperature adjustment operation member 54, the air mixing door 24 can be directly rotated. Because the small-diameter portion 25a of the rotation shaft 25 of the air mixing door 26 is inserted into the insertion hole 56d of the rotation shaft 56 in the air-conditioning operation panel 12, the diameter of the rotation shaft 25 of the air mixing door 26 can be made smaller, as compared with a case where the rotation shaft 25 has a recessed portion for an insertion.

A fourth preferred embodiment of the present invention will be now described with reference to FIGS. 12 and 13. In the above-described first through third embodiments, the defroster opening 33 and the face opening 34 are arranged in the vehicle right-left direction on the upper surface of the case 11. In this case, as shown in FIG. 4, the side face duct 41 extending in the vehicle right-left direction is crossed with the defroster duct 36 extending in the vehicle front-rear direction, and the mounting space of the air conditioner is increased due to the duct crossed portion.

Accordingly, in the fourth embodiment of the present invention, the duct arrangement is performed without a duct crossed portion. As shown in FIGS. 12 and 13, in the upper surface portion of the case 11, the defroster opening 33 is provided at a vehicle front side position, and the face opening 34 is provided at a vehicle rear side position from the defroster opening 33. That is, in the fourth embodiment, the defroster opening 33 and the face opening 34 are arranged in the vehicle front-rear direction. However, a center line of the defroster opening 33 in the vehicle front-rear direction is offset from a center line of the face opening 34 in the vehicle front-rear direction.

The defroster plate door 74 and the face plate door 75 are arranged in the vehicle front-rear direction to be offset from each other, for opening and closing the defroster opening 33 and the face opening 34. Further, a foot plate door 76 is disposed at a lower side of the defroster plate door 74 for opening and closing the foot opening 35, as shown in FIG. 13. The defroster plate door 74 is disposed at a right side in the upper surface portion of the case 11 to be rotatable around a rotation shaft 77 disposed in the vehicle front-rear direction. The face plate door 75 is disposed at a left side in the upper surface portion of the case 11 to be rotatable around a rotation shaft 78 disposed in the vehicle front-rear direction. Further, the foot plate door 76 is disposed to be rotatable around a rotation shaft 79 disposed in the vehicle front-rear direction at a lower side of the rotation shaft 77.

Link levers 80, 81, 82 are integrally connected to the rotation shafts 77–79, respectively, and the doors 74–76 are operated by a main link 73 through link levers 80–82, similarly to the above-described third embodiment. In the fourth embodiment, three pins 73a, 73b, 73d for driving the link levers 80, 81, 82 are provided in the main link 73.

Figure 12:
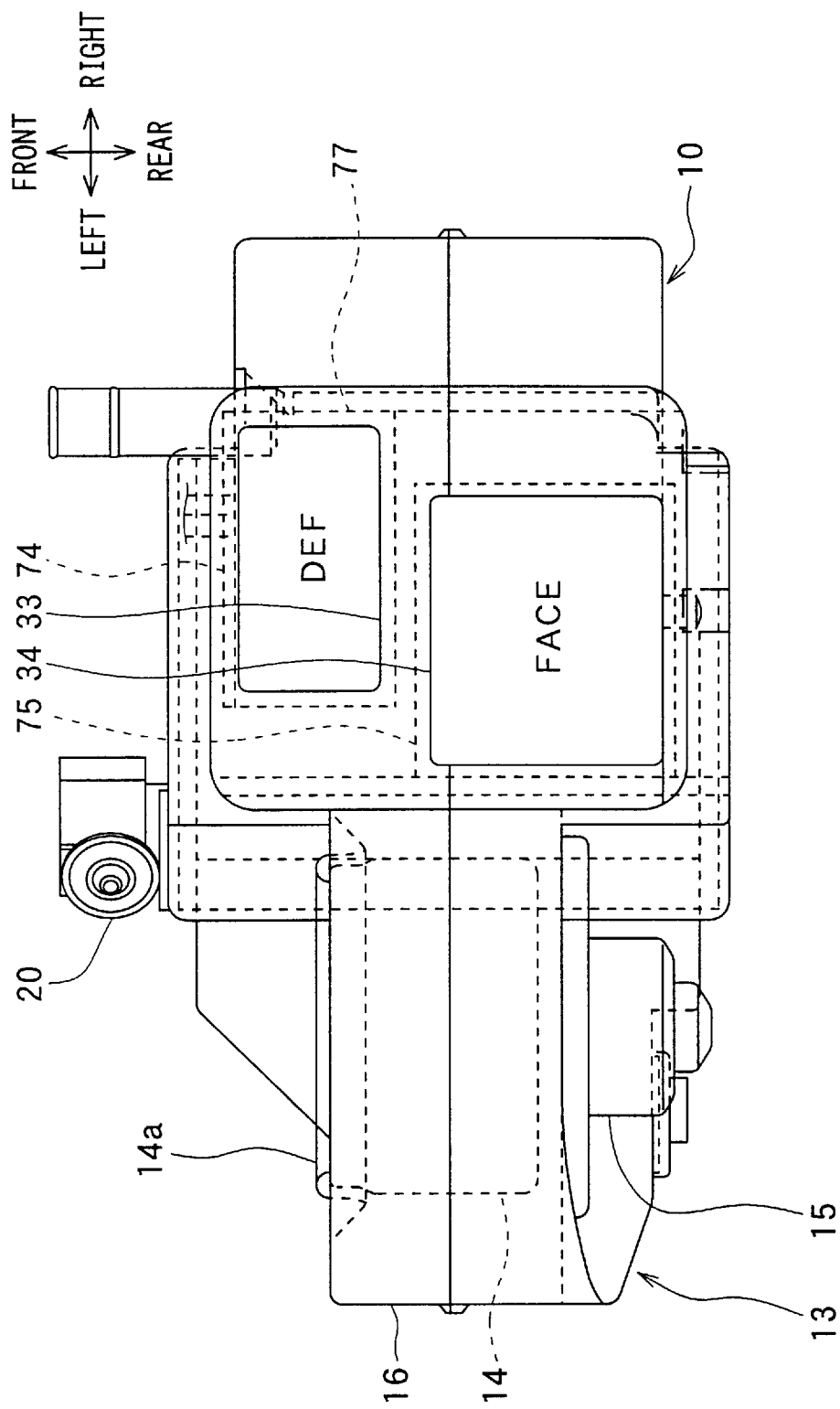
FIG. 12 is a top view showing an air conditioning unit of a vehicle air conditioner according to a fourth preferred embodiment of the present invention.
Figure 13:
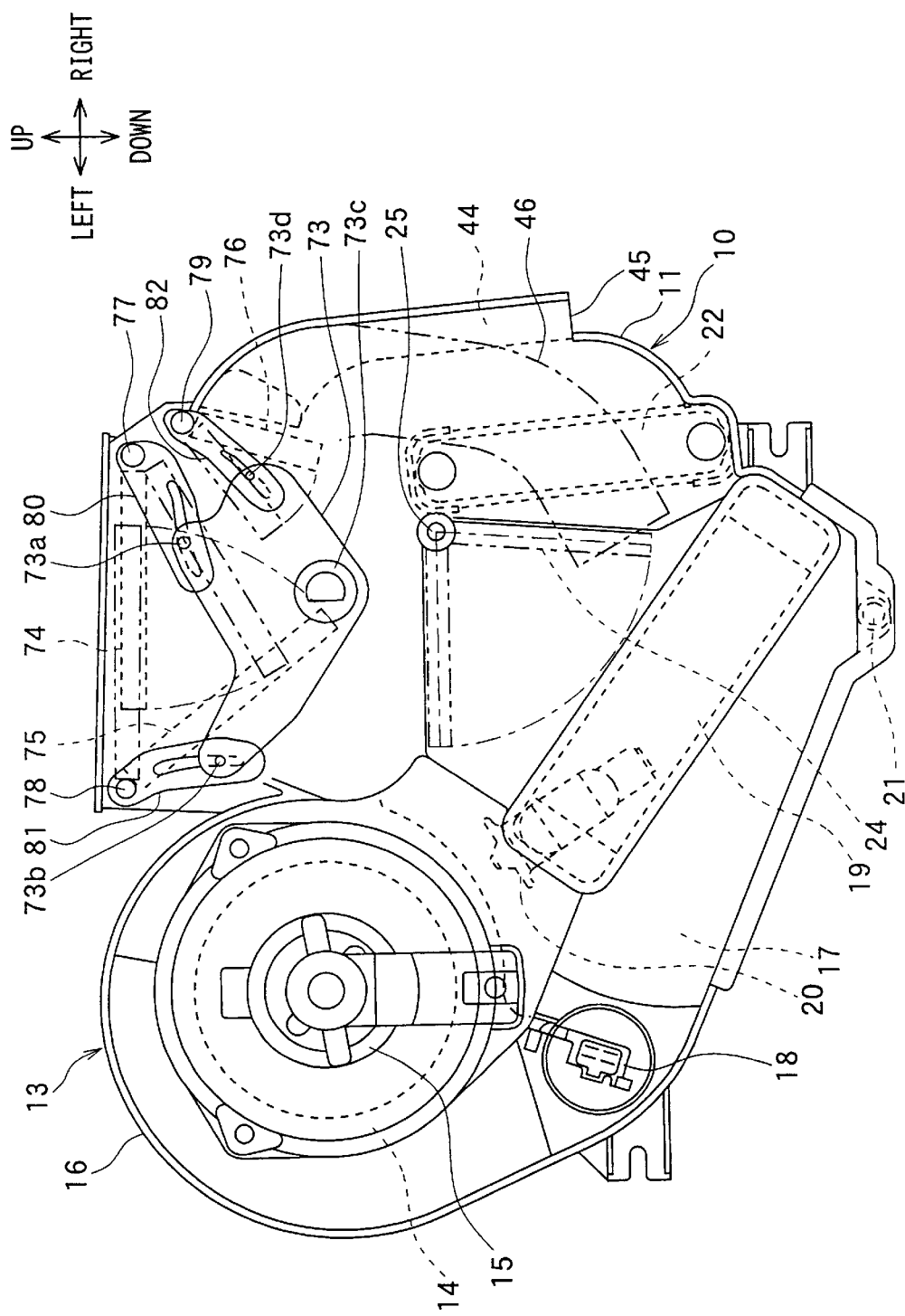
FIG. 13 is a front view showing the air conditioning unit according to the fourth embodiment.

In FIGS. 12 and 13, the air-conditioning operation panel 12 is not indicated. However, similarly to FIG. 11, the rotation shaft 55 of the mode switching operation member 53 is integrally connected to the shaft portion 73c of the main link 73. When the air-conditioning operation panel 12 is formed into a lateral elongated shape, the temperature adjustment operation member 54 is disposed at the right side of the mode switching operation member 53, and the rotation shaft 56 of the operation member 54 may be connected to the rotation shaft 25 of the air mixing door 24 through a suitable link mechanism similarly to the above-described first embodiment. Alternatively, the rotation shaft 56 of the temperature adjustment operation member 54 can be directly connected to the rotation shaft 25 of the air mixing door 24, similarly to the above-described third embodiment.

According to the fourth embodiment of the present invention, because the defroster opening 33 and the face opening 34 are arranged in the vehicle front-rear direction, a cross portion between a defroster duct connected to the defroster opening 33 and a side face duct connected to the face opening 34 is unnecessary. Thus, a mounting space of a duct portion of the vehicle air conditioner can be reduced.

A fifth preferred embodiment of the present invention will be now described with reference to FIG. 14. In the above-described first through fourth embodiment of the present invention, the blower portion, the heat-exchanging portion and the mode switching portion are integrally constructed in the case 11, so that an outer shape of the vehicle air conditioner is made compact. In the fifth embodiment, an arrangement layout in a vehicle air conditioner is changed. The vehicle air conditioner is constructed by a blower unit 90, a cooling unit 91 having therein an evaporator 19, and a heating unit 92. Those units 90, 91, 92 are integrally connected using connection portions 93, 94 for forming an air passage. The blower unit 90 is disposed inside the instrument panel at the front passenger's seat side, and the heating unit 92 is disposed inside the instrument panel at an approximate center in the vehicle right-left direction.

The blower unit 90 has a blower 13 with a structure substantially equal to the above-described blower 13 of the first embodiment. In the blower unit 90, a suction port 14*a* is provided at an upper side position of the blower 13, and an inside/outside air switching box 96 having therein an inside/outside air switching door 95 is disposed at an upper side of the suction port 14*a*. The inside/outside air switching door 95 is disposed to be rotatable around a rotation shaft 97 disposed in the vehicle front-rear direction, so that an inside air introduction or an outside air introduction can be selectively switched. A driving link lever 98 is integrally connected to the rotation shaft 97. In the cooling unit 91, the evaporator 19 has a structure similar to that of the above-described first embodiment.

In the heating unit 92, the parts similar to those of the above-described embodiments are indicated by the same reference numbers, and the explanation thereof is omitted. The air-conditioning operation panel 12 is formed into a lateral elongated shape, for example. The rotation shaft 55 of the mode switching operation member 53 and the rotation shaft 56 of the temperature adjustment operation member 54 are connected to the rotation shaft 29 of the mode switching rotary door 28 and the rotation shaft 25 of the air mixing door 24, respectively, by the structure similarly to that of the above-described first embodiment.

An inside/outside air switching operation member 100, composed of a lever which is operated to be slidable along a guiding recess 99 extending in the vehicle right-left direction, is provided in the air-conditioning operation panel 12. The lever-like inside/outside air switching operation member 100 is connected to the link lever 98 through a metal connection rod 101. The connection rod 101 is disposed along vehicle rear-side outer surfaces of the units 90, 91, 92.

According to the fifth embodiment of the present invention, the inside/outside air switching door 95 is rotated by the slide operation of the inside/outside air switching operation member 100 through the connection rod 101 and the link lever 98, so that an inside/outside air introduction mode can be switched. Accordingly, the inside/outside air switching door 95 can be manually operated by the slide operation of the operation member 100 without using a cable.

Figure 15:
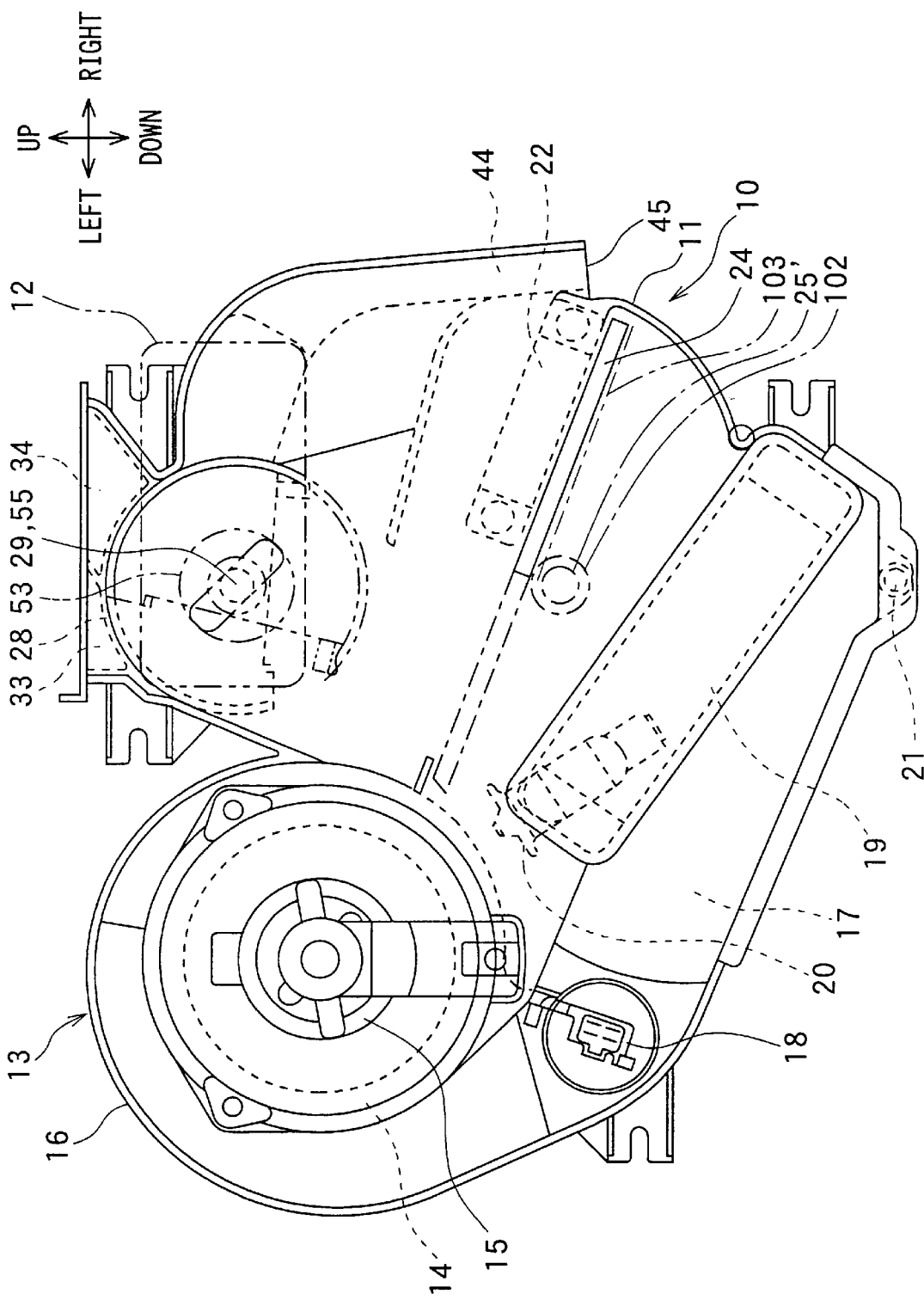
FIG. 15 is a front view showing a vehicle air conditioner according to a sixth preferred embodiment of the present invention.

A sixth preferred embodiment of the present invention will be now described with reference to FIG. 15. In the above-described first through fifth embodiments of the present invention, as the temperature adjustment air mixing door 24, a plate door rotating around the rotation shaft 25 is used. However, in the sixth embodiment, as shown in FIG. 15, as the temperature adjustment air mixing door 24, a slide door slidable linearly is used. Accordingly, in the sixth embodiment, the heater core 22 is disposed at an upper side of the evaporator 19 approximately horizontally, and the air mixing door 24 composed of a flat plate-like slide door is disposed to be slidably moved substantially horizontally in the vehicle right-left direction at a position directly under the heater core 22.

As a driving mechanism of the air mixing door 24 composed of the slide door, a rack and pinion mechanism can be used for example. In the sixth embodiment, a pinion 102 is provided in a driving rotation shaft 25' of the slidable air mixing door 24 to be engaged with a rack 103 provided on a lower side surface of the air mixing door 24, so that the air mixing door 24 is moved to be slidable in the vehicle right-left direction substantially horizontally. The rotation shaft 25' is connected to the rotation shaft 56 of the temperature adjustment operation member 54 of the air-conditioning operation member 12 to be rotated by the operation member 54.

Figures 16, 17:
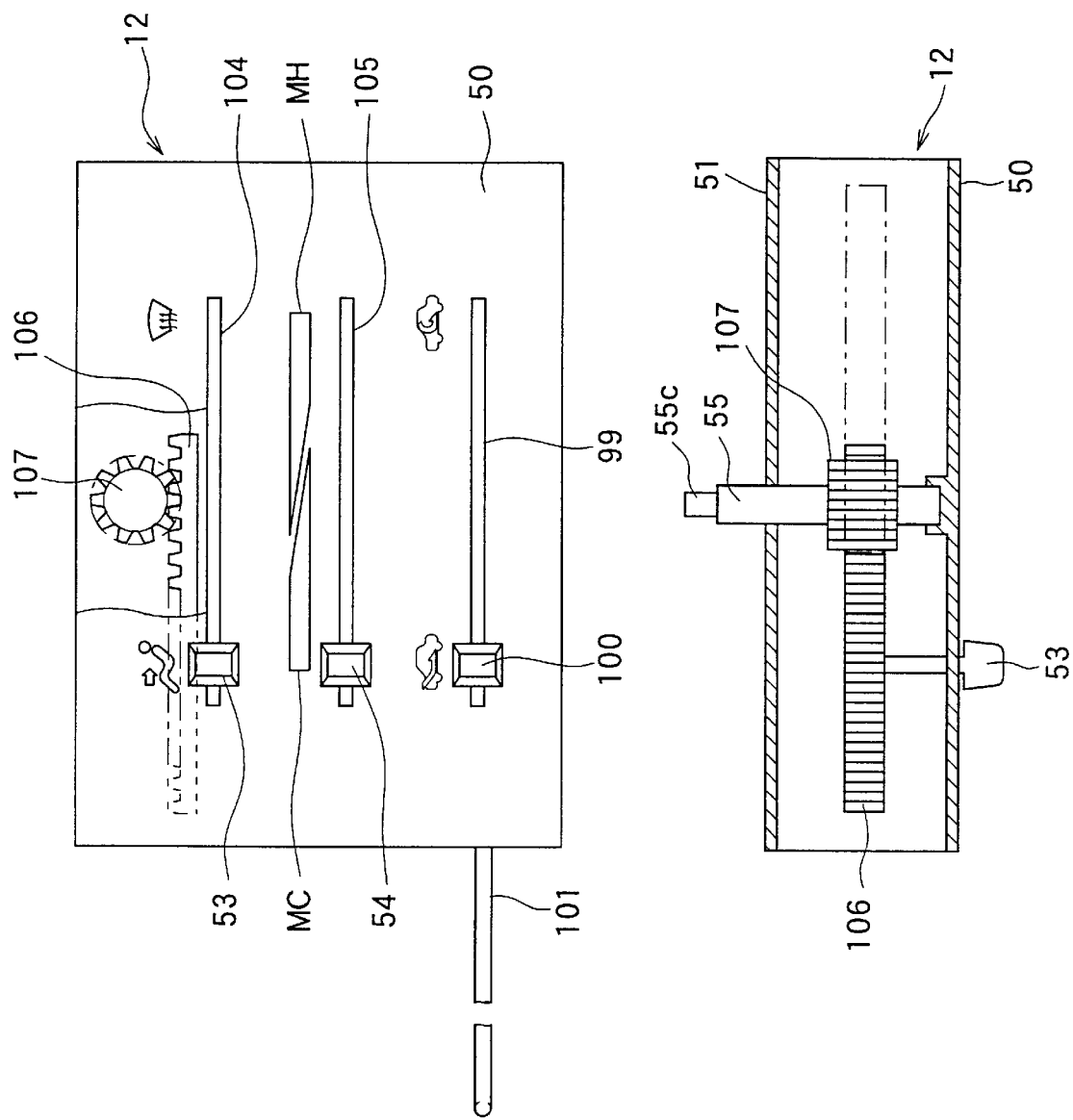
FIG. 16 is a front view showing an air-conditioning operation panel according to a seventh preferred embodiment of the present invention.
FIG. 17 is a sectional view showing an air-conditioning operation panel according to the seventh embodiment.

A seventh preferred embodiment of the present invention will be now described with reference to FIGS. 16 and 17. In the above-described first through sixth embodiments of the present invention, each of the mode switching operation member 53 and the temperature adjustment operation member 54 is constructed by a rotation member. However, in the seventh embodiment of the present invention, as shown in FIGS. 16 and 17, each of the operation members 53, 54, 100 is constructed by a lever-like member.

That is, guiding recesses 104, 105 extending in the vehicle right-left direction are provided in an operation surface portion (face surface portion of the body case 50) of the air-conditioning operation panel 12, so that the operation members 53, 54 can be operated to be slidable in the vehicle right-left direction along the guiding recesses 104, 105.

Here, an operation mechanism of the mode switching operation member 53 is described in detail with reference to FIG. 17, for example. A rack portion 106 is integrally formed with a top end portion of the lever operation member 53, and a pinion gear 107 engaging with the rack portion 106 is provided in the rotation shaft 55 rotatably supported in the air-conditioning operation panel 12. Accordingly, when the lever-like operation member 53 is slidably operated in the vehicle right-left direction, the pinion gear 107 rotates by the sliding operation of the rack portion 106. Therefore, a rotation displacement of the rotation shaft 55 is performed by the slide operation of the lever-like operation member 53. Thus, for example, by connecting the mode switching door 28 to the rotation shaft 55, an air outlet mode can be switched due to the slide operation of the lever-like operation member 53.

On the other hand, the converting mechanism due to the engagement between the rack portion 106 and the pinion gear 107 can be provided for the temperature adjustment operation member 54. Even in this case, the slide displacement of the lever-like operation member 54 can be converted to a rotation displacement of the rotation shaft 56. In addition, the lever-like operation member 100 is connected to the link lever 98 of the inside/outside air switching door 95 through the connection rod 101, similarly to the above-described fifth embodiment.

Although the present invention has been fully described in connection with the preferred embodiments thereof with reference to the accompanying drawings, it is to be noted that various changes and modifications will become apparent to those skilled in the art.

For example, in each of the above-described embodiments, the air conditioning unit 10 including the blower unit 13 is disposed inside the instrument panel at a vehicle front side in the passenger compartment. However, the present invention can be applied to a rear air conditioning unit for performing an air-conditioning for a vehicle rear side within the passenger compartment, disposed at a vehicle rear side between an inner plate and an outer plate of a vehicle side wall. In this case, an operation surface of an air-conditioning operation panel for the rear air conditioning unit can be disposed substantially in parallel with the vehicle front-rear direction. Accordingly, a rotation shaft of an air-conditioning operation member is disposed to extend in the vehicle right-left direction, and a door rotation shaft of the rear air conditioning unit is disposed to extend in the vehicle right-left direction. Thus, even in the rear air conditioning unit, the effects described in the above-described embodiments can be obtained.

In each of the above-described embodiments of the present invention, the air mixing door 24 for adjusting the ratio between warm air amount and cool air amount is used as temperature adjusting means so that an air heating amount of the heater core 22 is adjusted. However, a hot water valve for adjusting a flow amount of hot water flowing into the heater core 22 can be used as the temperature adjusting means. Even in this case, a rotation shaft of the hot water valve is disposed on the same direction as the rotation shaft 56, so that the hot water valve can be manually operated by the temperature adjustment operation member 54 without using a cable.

In the vehicle air conditioner of the above-described first embodiment, a rotation shaft (corresponding to the rotation shaft 97 of FIG. 14) of an inside/outside air switching door of an inside/outside air switching box connected to the suction port 14*a* of the blower 13 can be disposed in the vehicle front-rear direction. On the other hand, a rotation operation member for switching an inside/outside air mode can be provided in the air-conditioning operation panel 12, similarly to the operation members 53, 54. In this case, the rotation shaft of the inside/outside air switching operation member, provided in the vehicle front-rear direction, is connected to the rotation shaft of the inside/outside air switching door through a link mechanism, thereby the inside/outside air switching door can be manually operated by the rotation operation of the inside/outside air switching operation member without using a cable.

Figure 14:
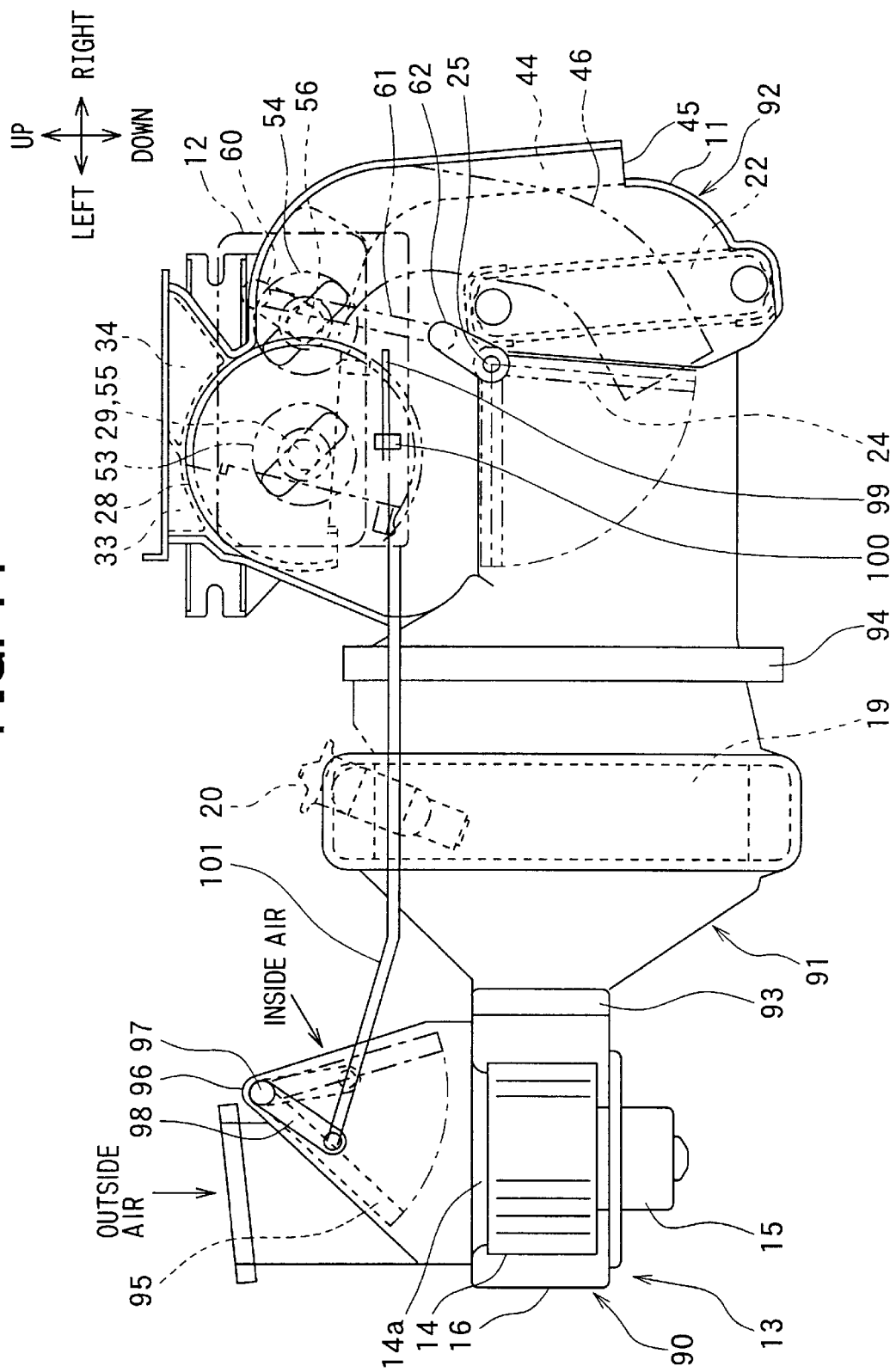
FIG. 14 is a front view showing a vehicle air conditioner according to a fifth preferred embodiment of the present invention.

In the fifth embodiment shown in FIG. 14, the inside/outside air switching operation member 100 is connected to the link lever 98 through the connection rod 101, for performing an opening/closing operation of the inside/outside air switching door 95. However, instead of the connection rod 101, a cable may be used. In this case, the opening/closing operation of the inside/outside air switching door 95 can be performed by the manual operation of the inside/outside air switching operation member 100 through the cable.

Further, a motor operated by the operation of the operation member 100 may be provided around the inside/outside air switching door 95, and the inside/outside air switching door 95 may be operated by the motor. Even in the other embodiments except for the fifth embodiment, the opening/closing operation described in the fifth embodiment can be performed.

In each of the above-described embodiments, the rotation shaft directions of the air mixing door 24 and the mode door 28, 66, 74–76 are the same as the rotation shaft directions of the operation members 53, 54 of the air-conditioning operation panel 12, respectively. However, any one of the rotation shaft direction of the temperature adjustment air mixing door 24 and the rotation shaft direction of the mode door 28, 66, 67, 74–76 may be the same as a corresponding one of a panel side rotation shaft direction of the operation member 53, 54. Even in this case, the above-described advantage can be obtained.

Such changes and modifications are to be understood as being within the scope of the present invention as defined by the appended claims.

What is claimed is:

1. An air conditioner for a vehicle having a passenger compartment, comprising:
   an air conditioning unit for adjusting an air state to be blown into the passenger compartment, the air conditioning unit having an adjustment door for adjusting an air flow and a first rotation shaft for rotating the adjustment door;
   an air-conditioning operation panel having a manually operated operation member, and a second rotation shaft rotated by the operation member, wherein:
   the first rotation shaft and the second rotation shaft are disposed on the same direction in such a manner that an operation force of the operation member transmits from the second rotation shaft to the first rotation shaft.

2. The air conditioner according to claim 1, wherein the operation member is a rotatably operated rotation member directly connected to the second rotation shaft.

3. The air conditioner according to claim 2, wherein:
   the second rotation shaft includes an input rotation shaft disposed to be rotatable by a rotation operation of the operation member, and an output rotation shaft which rotates by a rotation of the input rotation shaft through a gear wheel; and
   the second rotation shaft is disposed in such a manner that an operation force of the operation member is transmitted from the output rotation shaft to the first rotation shaft.

4. The air conditioner according to claim 1, wherein:
   the operation member is a slidable member disposed to be slidable;
   the air-conditioning operation panel has a converting mechanism through which a slide displacement of the operation member is converted to a rotation displacement; and
   the converting mechanism has an output side connected to the second rotation shaft.

5. The air conditioner according to claim 1, wherein:
   the first rotation shaft has an axial line on the same as that of the second rotation shaft; and
   the second rotation shaft is directly connected to the first rotation shaft.

6. The air conditioner according to claim 1, wherein:
   the first rotation shaft has an axial line offset from that of the second rotation shaft; and
   the second rotation shaft is connected to the first rotation shaft through a link mechanism.

7. The air conditioner according to claim 1, wherein:
   the first rotation shaft has an axial line offset from that of the second rotation shaft; and
   the second rotation shaft is connected to the first rotation shaft through a gear wheel.

8. The air conditioner according to claim 1, wherein:
   the air conditioning unit includes a case defining an air passage, the case having a plurality of air openings from which air is blown into the passenger compartment;

the adjustment door is a rotary door for selectively opening and closing the air openings to set an air outlet mode for the passenger compartment;

the rotary door has a door surface that is disposed at a predetermined position separated from the first rotation shaft radial outside to be rotated integrally with the first rotation shaft; and the door surface is disposed to open and close the air openings.

9. The air conditioner according to claim 8, wherein at least both of the air openings are arranged in a vehicle right-left direction.

10. The air conditioner according to claim 8, wherein:

the second shaft has a circular plate portion with an outer peripheral surface;

the outer peripheral surface of the circular plate portion has a plurality of recesses;

the air-conditioning operation panel further includes a ball for engaging with the recesses, and a spring member connected to the ball; and when the circular plate portion rotates, the ball press-contacts the outer peripheral surface of the circular plate portion by spring force of the spring member.

11. The air conditioner according to claim 6, wherein:

the air conditioning unit includes a case defining an air passage, the case having a plurality of air openings from which air is blown into the passenger compartment;

the adjustment door includes a plurality of plate doors for opening and closing the air openings;

the first rotation shaft is constructed by plural door rotation shafts disposed, respectively, in the plate doors;

the link mechanism includes a common link for rotating the door rotation shafts; and the common link is disposed so that the operation force of the operation member transmits from the second rotation shaft to the common link.

12. The air conditioner according to claim 11, wherein the plate doors are disposed to be offset from each other in an axial direction of the door rotation shafts.

13. The air conditioner according to claim 1, wherein:

the air conditioning unit includes an inside/outside air switching box having an inside air introduction port from which inside air inside the passenger compartment is introduced and an outside air introduction port from which outside air outside the passenger compartment is introduced;

the adjustment door includes an inside/outside air switching door for opening and closing the inside air introduction port and the outside air introduction port;

the operation member includes an inside/outside air switching operation portion; and the first rotation shaft has a door rotation shaft that is coupled to the second rotation shaft in such a manner that the operation force of the inside/outside air switching operation portion is transmitted to the door rotation shaft of the inside/outside air switching door through a connection rod.

14. The air conditioner according to claim 1, wherein:

the air-conditioning operation panel is attached to the air conditioning unit to construct an integrated member; and the integrated member is mounted on the vehicle.

15. The air conditioner according to claim 1, wherein:

the air conditioning unit is disposed inside an instrument panel of the vehicle; and the first rotation shaft and the second rotation shaft are toward in a vehicle front-rear direction.

16. The air conditioner according to claim 1, wherein:

the air conditioning unit includes a case defining an air passage, the case having a plurality of air openings from which air is blown into the passenger compartment;

the adjustment door is a rotary door for selectively opening and closing the air openings to set an air outlet mode for the passenger compartment; and at least both of the air openings are arranged in a vehicle right-left direction.

17. The air conditioner according to claim 1, wherein:

the second shaft has a circular plate portion with an outer peripheral surface;

the outer peripheral surface of the circular plate portion has a plurality of recesses;

the air-conditioning operation panel further includes a ball for engaging with the recesses, and a spring member connected to the ball; and when the circular plate portion rotates, the ball press-contacts the outer peripheral surface of the circular plate portion by spring force of the spring member.

18. An air conditioner for a vehicle having a passenger compartment, comprising:

an air conditioning unit for performing an air conditioning for the passenger compartment, the air conditioning unit having an adjustment door for adjusting an air flow and a first rotation shaft for rotating the adjustment door;

an air-conditioning operation panel having a manually operated operation member, and a second rotation shaft rotated by the operation member, wherein:

the first rotation shaft and the second rotation shaft are disposed in such a manner that an operation position of the adjustment door changes in accordance with an operation position of the operation member;

the air-conditioning operation panel is attached to the air conditioning unit to construct an integrated member; and the integrated member is mounted in an instrument panel of the vehicle.

19. The air conditioner according to claim 18, wherein the air conditioning unit includes a blower unit for blowing air.

* * * * *